US011026055B1

(12) United States Patent
Rea

(10) Patent No.: US 11,026,055 B1
(45) Date of Patent: Jun. 1, 2021

(54) WIRELESS COMMUNICATION NETWORK MANAGEMENT FOR USER DEVICES BASED ON REAL TIME MAPPING

(71) Applicant: Pivotal Commware, Inc., Kirkland, WA (US)

(72) Inventor: Adam Deloss Rea, Edmonds, WA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

(21) Appl. No.: 16/983,978

(22) Filed: Aug. 3, 2020

(51) Int. Cl.
*H04W 4/029* (2018.01)
*H04W 76/10* (2018.01)
*H04W 4/02* (2018.01)
*H04W 16/28* (2009.01)
*H04B 7/06* (2006.01)

(52) U.S. Cl.
CPC .......... *H04W 4/029* (2018.02); *H04B 7/0617* (2013.01); *H04W 4/026* (2013.01); *H04W 16/28* (2013.01); *H04W 76/10* (2018.02)

(58) Field of Classification Search
CPC ..... H04W 4/029; H04W 4/026; H04W 16/28; H04W 76/10; H04B 7/0617
See application file for complete search history.

(56) References Cited

U.S. PATENT DOCUMENTS 2,131,108 A 9/1938 Lindenblad
6,133,880 A 10/2000 Grangeat et al.
6,150,987 A * 11/2000 Sole .................. H01Q 3/02
343/757
7,084,815 B2 8/2006 Phillips et al.
7,205,949 B2 4/2007 Turner
9,356,356 B2 5/2016 Chang et al.
(Continued)

FOREIGN PATENT DOCUMENTS

CN 106797074 A 5/2017
JP 61-1102 A 1/1986
(Continued)

OTHER PUBLICATIONS

Office Communication for U.S. Appl. No. 15/925,612 dated Jun. 15, 2013, pp. 1-9.
(Continued)

*Primary Examiner* — Marcos L Torres
(74) *Attorney, Agent, or Firm* — John W. Branch; Branch Partners PLLC

(57) ABSTRACT

An apparatus for providing wireless communication between an RF communication device and remotely located RF base station devices or RF repeater devices to establish a wireless connection with a wireless carrier authorized to communicate with one or more wireless user devices (UEs) in communication with the RF communication device. The RF communication devices may employ separate wireless communication channels to communicate with one or more remote RF base station devices, remote RF repeater devices, remote network management applications, and local UEs. An RF communication device may employ a map to select a currently available RF base station device or an RF repeater device to establish a wireless connection between an authorized wireless carrier and the one or more local UEs in communication with the RF communication device.

24 Claims, 13 Drawing Sheets

(56) References Cited

U.S. PATENT DOCUMENTS

| | | |
|---|---|---|
| 9,385,435 B2 | 7/2016 | Bily et al. |
| 9,450,310 B2 | 9/2016 | Bily et al. |
| 9,551,785 B1 | 1/2017 | Geer |
| 9,606,416 B2 | 3/2017 | Denoyer |
| 9,635,456 B2 | 4/2017 | Fenichel |
| 9,711,852 B2 | 7/2017 | Chen et al. |
| 9,806,414 B2 | 10/2017 | Chen et al. |
| 9,806,415 B2 | 10/2017 | Chen et al. |
| 9,812,779 B2 | 11/2017 | Chen et al. |
| 10,033,109 B1 | 7/2018 | Gummalla et al. |
| 10,225,760 B1 | 3/2019 | Black |
| 10,313,894 B1 | 6/2019 | Desclos et al. |
| 10,463,767 B2 | 11/2019 | McCandless et al. |
| 10,734,736 B1 | 8/2020 | McCandless et al. |
| 2002/0196185 A1 | 12/2002 | Bloy |
| 2003/0025638 A1 | 2/2003 | Apostolos |
| 2005/0237265 A1 | 10/2005 | Durham et al. |
| 2007/0024514 A1 | 2/2007 | Phillips et al. |
| 2008/0181328 A1 | 7/2008 | Harel et al. |
| 2009/0207091 A1 | 8/2009 | Anagnostou et al. |
| 2010/0248859 A1 | 9/2010 | Kawabata |
| 2010/0302112 A1 | 12/2010 | Lindenmeier et al. |
| 2011/0070824 A1* | 3/2011 | Braithwaite .......... H04W 16/26 455/25 |
| 2011/0199279 A1 | 8/2011 | Shen et al. |
| 2012/0194399 A1 | 8/2012 | Bily et al. |
| 2013/0069834 A1 | 3/2013 | Duerksen |
| 2013/0231066 A1 | 9/2013 | Zander et al. |
| 2014/0094217 A1 | 4/2014 | Stafford |
| 2014/0171811 A1 | 6/2014 | Lin et al. |
| 2014/0198684 A1 | 7/2014 | Gravely et al. |
| 2014/0266946 A1 | 9/2014 | Bily et al. |
| 2014/0293904 A1 | 10/2014 | Dai et al. |
| 2014/0308962 A1* | 10/2014 | Zhang ................... H04W 36/32 455/440 |
| 2015/0109178 A1 | 4/2015 | Hyde et al. |
| 2015/0109181 A1 | 4/2015 | Hyde et al. |
| 2015/0116153 A1 | 4/2015 | Chen et al. |
| 2015/0162658 A1 | 6/2015 | Bowers et al. |
| 2015/0222021 A1 | 8/2015 | Stevenson et al. |
| 2015/0229028 A1 | 8/2015 | Bily et al. |
| 2015/0276926 A1 | 10/2015 | Bowers et al. |
| 2015/0276928 A1 | 10/2015 | Bowers et al. |
| 2015/0288063 A1 | 10/2015 | Johnson et al. |
| 2015/0318618 A1 | 11/2015 | Chen et al. |
| 2015/0372389 A1 | 12/2015 | Chen et al. |
| 2016/0037508 A1 | 2/2016 | Sun |
| 2016/0079672 A1 | 3/2016 | Cerreno |
| 2016/0087334 A1 | 3/2016 | Sayama et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0174241 A1 | 6/2016 | Ansari et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0345221 A1 | 11/2016 | Axmon et al. |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0238141 A1 | 8/2017 | Lindoff et al. |
| 2017/0339575 A1 | 11/2017 | Kim et al. |
| 2017/0367053 A1 | 12/2017 | Noh et al. |
| 2017/0373403 A1 | 12/2017 | Watson |
| 2018/0027555 A1 | 1/2018 | Kim et al. |
| 2018/0066991 A1 | 3/2018 | Mueller et al. |
| 2018/0097286 A1 | 4/2018 | Black et al. |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0337445 A1 | 11/2018 | Sullivan et al. |
| 2019/0067813 A1 | 2/2019 | Igura |
| 2019/0221931 A1 | 7/2019 | Black et al. |
| 2019/0289482 A1 | 9/2019 | Black |

FOREIGN PATENT DOCUMENTS

| | | |
|---|---|---|
| JP | 936656 A | 2/1997 |
| JP | 2007081648 A | 3/2007 |
| JP | 2007306273 A | 11/2007 |
| JP | 2014207626 A | 10/2014 |
| JP | 2017-220825 A | 12/2017 |
| KR | 10 2016 0113100 A | 9/2016 |
| WO | 2012050614 A1 | 4/2012 |
| WO | 2015196044 A1 | 12/2015 |
| WO | 2017014842 A1 | 1/2017 |
| WO | 2018179870 A1 | 10/2018 |

OTHER PUBLICATIONS

U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2013, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for international Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. pp. 10.1109/LAWP.2017, pp. 1-4.
International Search Report and Written Opinion for international Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Application No. PCT/US2019/041053 dated Aug. 27, 2019, pp. 1-15.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-14.
Office Communication for U.S. Appl. No. 16/049,630 dated Dec. 9, 2019, pp. 1-13.

(56) References Cited

OTHER PUBLICATIONS

Office Communication for U.S. Appl. No. 16/440,815 dated Jan. 8, 2020, pp. 1-8.
Office Communication for U.S. Appl. No. 16/730,932 dated Mar. 6, 2020, pp. 1-14.
Office Communication for U.S. Appl. No. 16/049,630 dated Mar. 31, 2020, pp. 1-16.
Office Communication for U.S. Appl. No. 16/734,195 dated Mar. 20, 2020, pp. 1-9.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-12.
Gao, S.S. et al., "Holographic Artificial Impedance Surface Antenna Based on Circular Patch", 2018 International Conference on Microwave and Millimeter Wave Technology (ICMMT), 2018, pp. 1-9.
Nishiyama,Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No, PCT/US2020/013713 dated Apr. 21, 2020, pp. 1-9.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/049,630 dated Oct. 15, 2020, pp. 1-16.
International Search Report and Written Opinion for Application No. PCT/US2020/048806 dated Nov. 17, 2020, pp. 1-15.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.

* cited by examiner

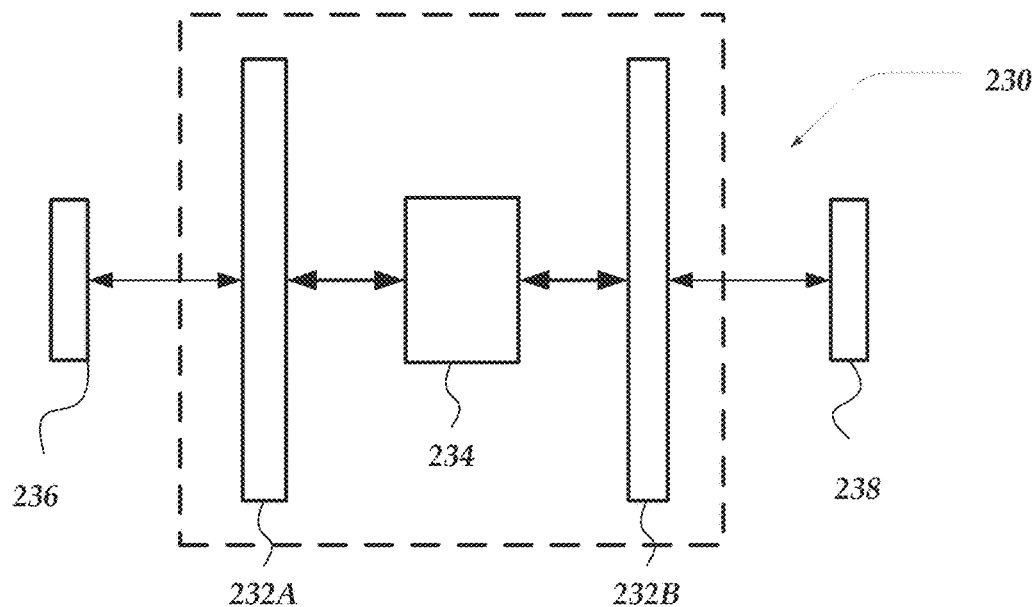
RELAY DEVICE
FIG. 2C
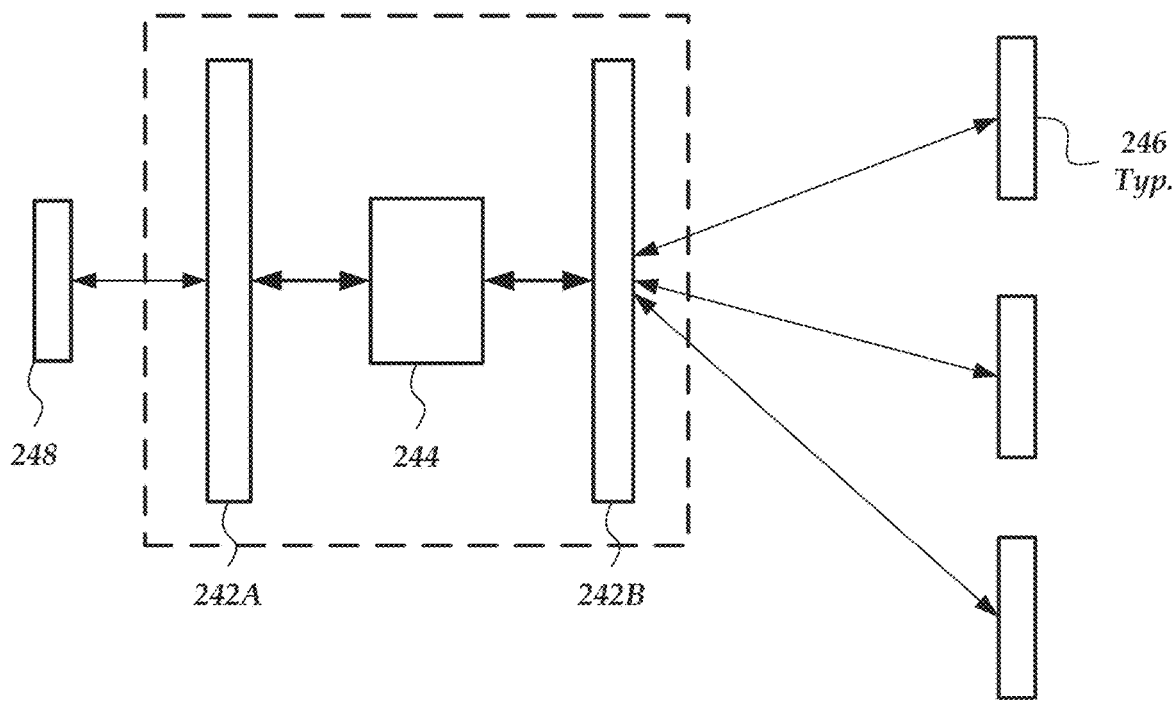
REFLECTOR DEVICE FIG. 2D

BASE STATION PROXY

RF COMM. DEVICE

WIRELESS COMMUNICATION NETWORK MANAGEMENT FOR USER DEVICES BASED ON REAL TIME MAPPING

TECHNICAL FIELD

The invention relates generally to employing antennas that use beams of wireless signals to provide wireless communication between RF communication sources and user communication devices on a wireless carrier network. Further, in various embodiments, real time mapping of physical locations and pose information is employed to dynamically direct beams of wireless signals to maintain communication over the network.

BACKGROUND

Mobile devices are the primary mode of wireless communication for the vast majority of people worldwide. In the first few generations of wireless communication networks, mobile devices were generally used for voice communication, text messages, and somewhat limited internet access. Each new generation of wireless communication networks has provided substantially more bandwidth for different types services for mobile device users, such as purchasing products, paying invoices, streaming movies, playing video games, online learning, dating, multimedia messaging, and more. Also, as wireless communication networks advance from first generation technology to higher generations, the frequency and strength of the communicated wireless signals is increased to provide greater bandwidth with less latency. Further, beam formed wireless signals are often used at the higher frequencies to provide an increase in bandwidth and reduce latency between remote service nodes, such as wireless RF base stations, and user devices, e.g., mobile telephones and customer premises equipment (CPEs).

To provide higher generations of wireless communication, a repeater device may be employed to communicate beam formed download wireless signals and/or upload wireless signals between a wireless base station and the one or more user devices. Repeater devices for higher generation wireless communication networks are often tasked with providing accurate directivity of beam formed wireless signals without having insight into the contents of the data channel, which often creates problems in delineating spectrally adjacent service nodes when the physical locations/orientation of the adjacent service nodes or the pose of the repeater devices change over time. Also, since the wireless frequency spectrum of higher generation wireless communication licensed to different wireless carriers is chopped up into frequency bands, multiple service nodes may be visible to a given repeater device at the same time. Also, since the licensed frequency bands can be adjacent to each other for two or more different wireless carriers, the wireless signals detected by the repeater device may be close enough in frequency that a power measurement of the wireless signals may not help in selecting the correct service node for the wireless carrier authorized to communicate with user devices serviced by the repeater device.

BRIEF DESCRIPTION OF THE DRAWINGS

FIG. 2C illustrates an exemplary embodiment of an RF repeater device that is arranged as an RF relay device that forwards communication of RF signals to one of another RF relay device, an RF reflector device, an RF base station proxy device, an RF communication device, an RF base station device, or a user device (UE);

FIG. 2D illustrates an exemplary embodiment of an RF repeater device that is arranged as an RF reflector device that forwards communication of RF signals to a plurality of one or more of another RF reflector device, an RF relay device, an RF base station proxy device, an RF communication device, RF communication node, an RF base station device or a UE;

DESCRIPTION OF THE VARIOUS EMBODIMENTS

Figure 1A:
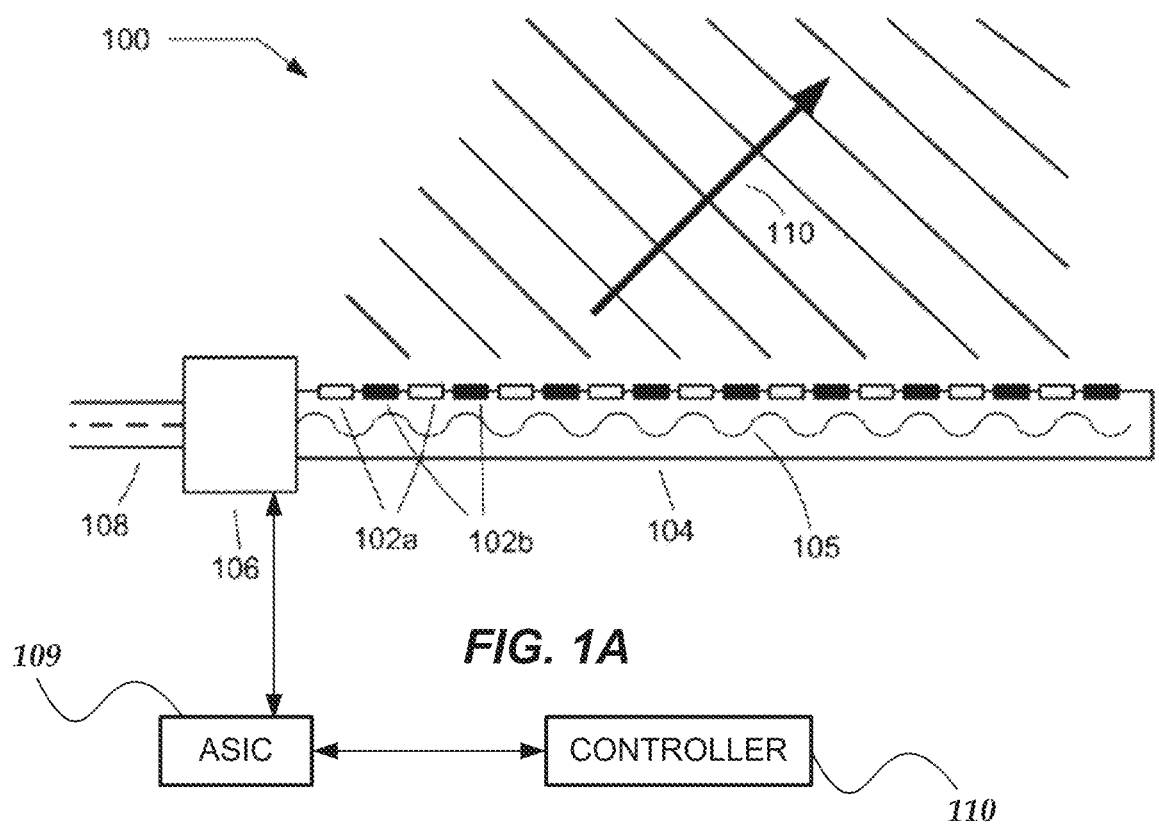
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

As used herein, "pose" refers to a physical position of an RF Communication device, RF Repeater device, and/or components of these devices, that may include one or more antennas, such as HMAs, patch antennas, or sector antennas. The pose includes different types of information, including one or more of coordinates for a physical location, an altitude, a direction relative to magnetic north and/or true north, a tilt, an acceleration, a motion, or the like.

As used herein, "base station" refers to a network computing device that facilitates wireless communication between a wireless network and a plurality of different types of wireless computing devices employed by users, which can also be referred to as user equipment (UE). The wireless network can employ any type of wireless communication protocols or wireless technologies.

Briefly stated, various embodiments of the invention are directed to a method, apparatus, or a system that provides wireless communication between an RF communication device and remotely located RF base station devices or RF repeater devices to establish a wireless connection with a wireless carrier authorized to communicate with one or more wireless user devices (UEs) in communication with the RF communication device.

In one or more embodiments, one or more RF communication devices may employ separate wireless communication channels to communicate with one or more remote RF base station devices, remote RF repeater devices, remote network management applications, and local UEs. For example, an RF communication device may employ one or more HMA antennas to communicate beam waveforms for 5G RF signals with remote RF base station devices and/or remote RF repeater devices, directional or omnidirectional antennas that more generally communicate 5G RF signals with local UEs, and an omnidirectional antenna that communicates 4G RF signals, such as Long Term Evolution (LTE), with one or more remotely located network management applications.

Also, in one or more embodiments, an RF communication device may employ a map to select a currently available RF base station device or an RF repeater device to establish a wireless connection between an authorized wireless carrier and the one or more local UEs in communication with the RF communication device. In one or more embodiments, the map may include various types of information regarding: physical locations for one or more RF communication structures, e.g., cellular communication towers, poles, wall brackets, and the like; RF base station devices and/or RF repeater devices that are attached to the RF communication structures; and one or more associations of one or more wireless carriers with the one or more RF base station devices and/or the RF repeater devices. Further, in one or more embodiments, the map may include various types of information related to establishing wireless connections between the UEs and the wireless carriers.

In one or more embodiments, wireless carriers and/or remotely located network management applications may initially provide one or more portions of the various types of information included in the map, such as, latitude, longitude, and elevation coordinates for RF communication structures, position data for RF base station devices and/or RF repeater devices attached to the structures, e.g., pose data and orientation data, and one or more associations of these devices with one or more wireless carriers.

In one or more embodiments, the RF communication device may employ on-board components to determine position data and location data for the RF communication device that is added to the map. For example, in one or more embodiments, location data, e.g., latitude, longitude, and elevation, nominally (but not necessarily) may be provided for the map by Global Positioning Systems (GPS) components and/or RF triangulation components. Further, in one or more embodiments, position data for the RF communication device may be provided by other on-board components, e.g., a six degree of freedom sensor, a three-dimensional accelerometer, and/or a three-dimensional magnetometer. These other on-board components my provide pose data and/or physical orientation data that is used to determine the overall position of the RF communication device. Also, in one or more other embodiments, an RF repeater device, and/or an RF base station device my employ substantially the same on-board components to determine its current position data and current location data that is subsequently provided for addition to the map.

In one or more embodiments, an RF Communication device may originally receive the map by one or more out of band communication mechanisms, such as in an on-board memory, a Long Term Evolution (LTE) wireless communication channel, a portable Universal Serial Bus (USB) drive, or the like. In one or more embodiments, the various information may be initially included in the map or added through subsequent discovery of RF base station devices and/or RF repeater devices that are currently available to wirelessly communicate above an RF power level with the RF communication device. Further, in one or more embodiments, the map may be provided by one or more wireless carriers or a remote network management application in communication with RF communication devices, RF repeater devices, and RF base station devices on the network.

Additionally, in one or more embodiments, the various information included in the map may be used to determine a beam angle for an RF waveform radiated by one or more HMA antennas of an RF communication device at currently available RF base station device or an RF repeater device to establish a connection between the one or more UEs in communication with the RF communication device and a wireless carrier authorized to communicate with these UEs.

In one or more embodiments, a map indicating the locations of RF communication structures may improve the effectiveness of RF communication devices in selecting a currently available RF base station device or an RF repeater device to establish a connection between the one or more UEs in communication with an RF communication device and a wireless carrier authorized to communicate with these UEs.

In one or more embodiments, a plurality of RF repeater devices deployed in the network my employ trilateration techniques to determination their respective location data and position data which can be provided to a remote network management application. The application may employ the location and position data to construct a global map of the network and also update the map over time in response to changes to new data provided by the plurality of RF repeater devices and/or RF base station devices. In one or more embodiments, the remote network management application may employ the global map to establish a localized, near real-time network connection topology, which could be used for gateway fault recovery, network load balancing at the 'last mile', network health metrics, and network utility assessment.

Illustrated Operating Environment

FIG. 1A illustrates one embodiment of a holographic metasurface antenna (HMA) which takes the form of a surface scattering antenna 100 that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC)109 is employed to control the operation of the row of scattering elements 102a and 102b. Further, controller 110 may be employed to control the operation of one or more ASICs that control one or more rows in the array.

Figure 1B:
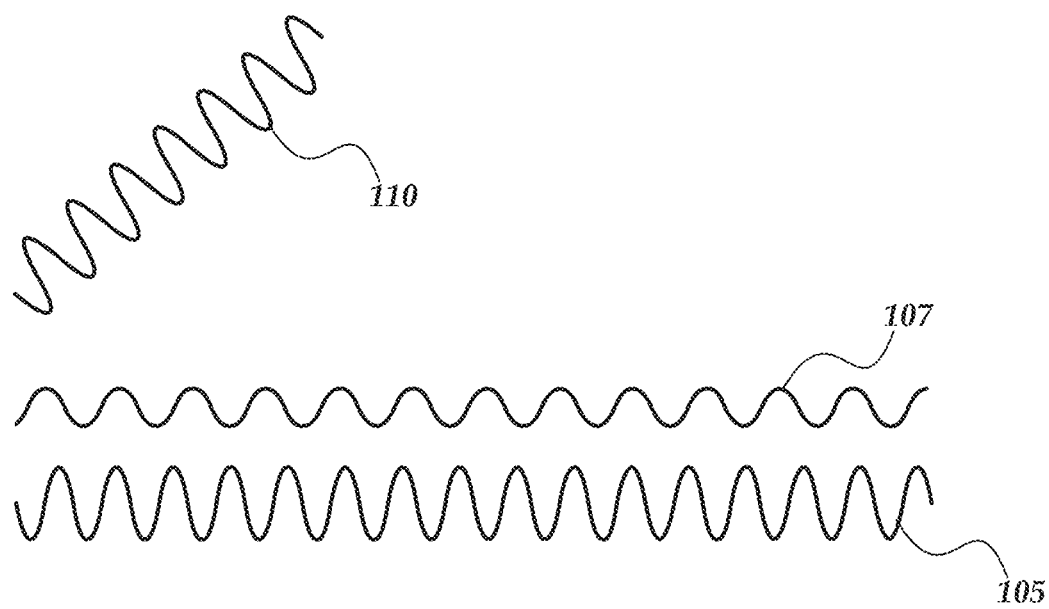
FIG. 1B shows a representation of one embodiment of a synthetic array illustrating a reference waveform and a hologram waveform (modulation function) that in combination provide an object waveform of electromagnetic waves.
Figure 1C:
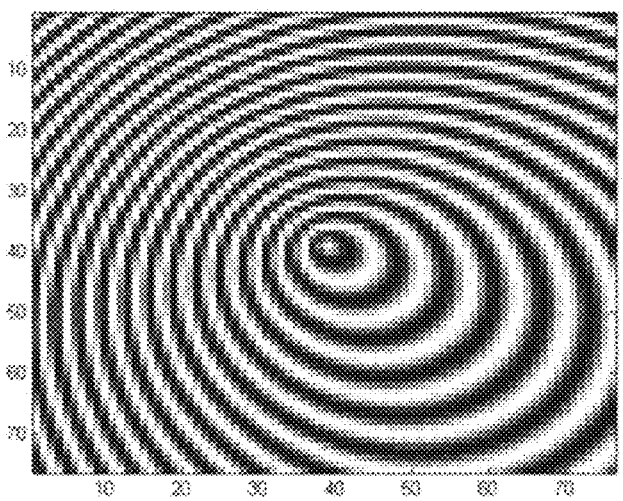
FIG. 1C shows an embodiment of an exemplary modulation function for an exemplary surface scattering antenna.
Figure 1D:
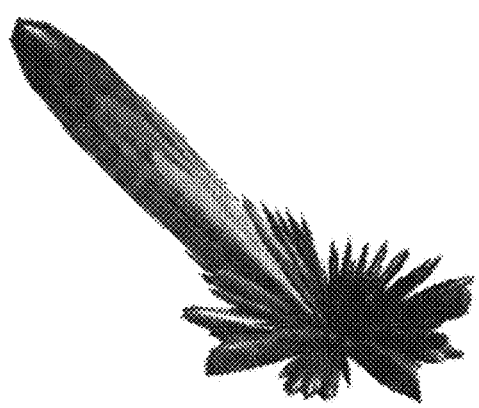
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^*\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic meta-surface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 1E:
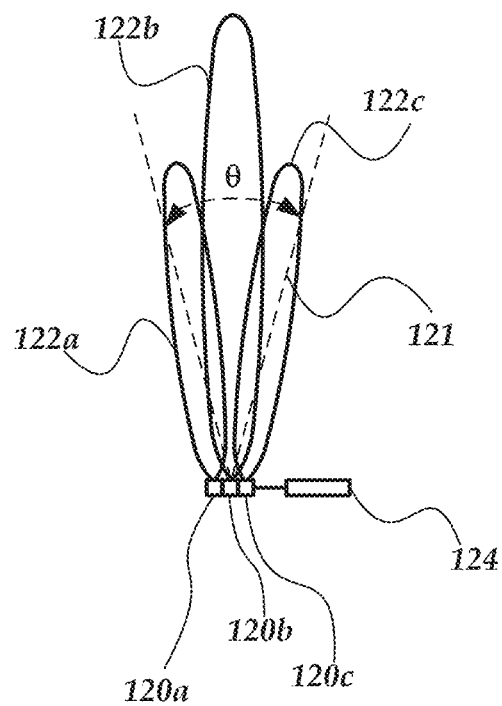
FIG. 1E shows a side view of another embodiment of an exemplary arrangement of multiple instances of HMAs.
Figure 1F:
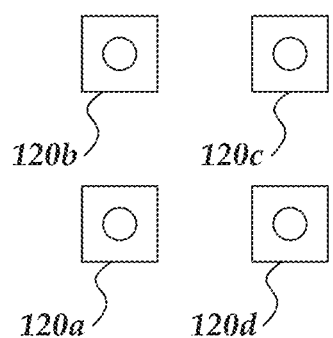
FIG. 1F shows a top view of yet another embodiment of an exemplary arrangement of multiple instances of HMAs.

FIG. 1E illustrates an arrangement of HMAs 120a, 120b, 120c that produce beams 122a, 122b, 122c where the middle beam 122b is substantially different in size and shape from the other two beams 122a, 122c. FIG. 1F illustrates, in a top view, yet another arrangement of HMAs 120a, 120b, 120c, 120d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 1E and 1F.

Figure 2A:
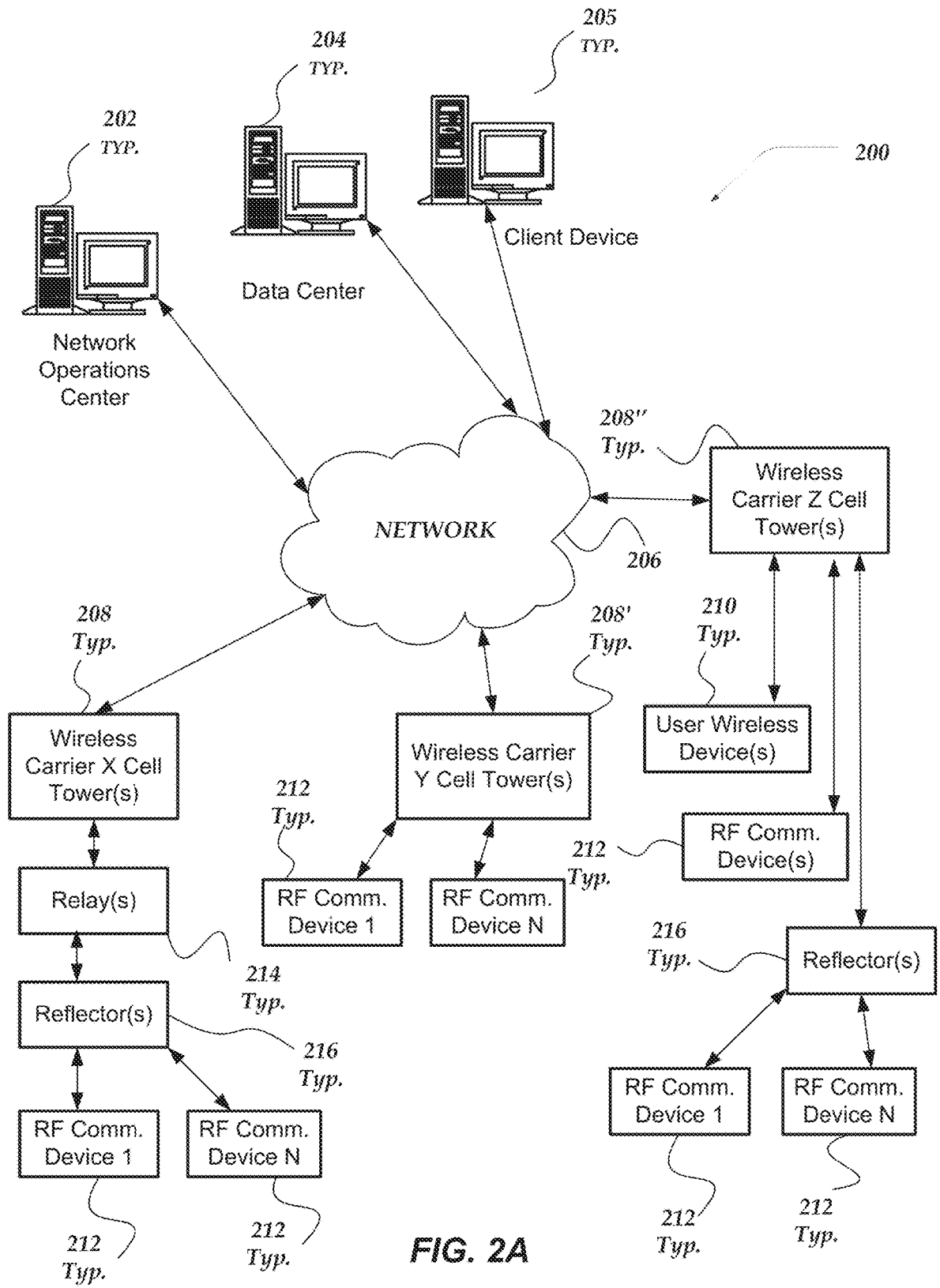
FIG. 2A shows a top view of an embodiment of an exemplary environment, including an arrangement of a network operations center, RF base station devices, RF repeater devices, user devices, and RF communication devices.

As shown in FIG. 2A, an overview of system 200 is illustrated for communicating data from one or more data centers 204 which employs one or more network operations centers 202 to route the data to one or more cellular communication towers 208', 208', and 208" that are associated with different wireless carriers (X, Y and Z) which communicate the data in the form of RF wireless signals to one or more user wireless devices (UEs) 210 and RF communication devices 212 which provide communication with other remote UEs (not shown). As shown, the data is communicated from one or more data centers 204 and routed in part by one or more NOCs 202 over network 206 to a plurality of RF communication nodes located on a plurality of cellular communication towers 208, 208' and 208" associated with different wireless carriers that are authorized to communicate the data directly with one or more UEs 218, or one or more RF Communication devices 212 or RF repeater devices arranged as RF relay devices 214 or RF reflector devices 216. One or more user wireless devices (UEs) 210 are in communication with one or more RF communication devices 212 which are arranged to multiplex communication of one or more of downlink wireless signals or uplink wireless signals between one or more identified UEs 212 and a wireless carrier authorized to provide communication for the UEs. Also, one or more client devices 205 and service devices 211 may execute various network management applications that may distribute a map and manage, analyze and control the operation of the network and RF communication devices 212, RF relay devices 214 and/or RF reflector devices 216. As shown, an RF base station device may also communicate directly with one or more UEs, while also multiplexing communication with RF communication devices 212, reflector devices 216, RF relay devices 214 and RF base station proxy devices.

Although not shown, one or more of RF Relay device 214, RF reflector device 216, and RF base station proxy device may be a separate RF repeater device that employs an interface to directly communicate wireless signals with a co-located RF communication node, such as an RF base station device through a physical connection, such as a coaxial fiber cable, waveguide, or other type of cable capable of communicating at least uplink and downlink wireless signals.

Network 206 may be configured to couple network operation center computers with other computing devices, including RF communication nodes located at cellular communication towers. Network 206 may include various wired and/or wireless technologies for communicating with a remote device, such as, but not limited to, USB cable, Bluetooth®, Wi-Fi®, or the like. In some embodiments, network 206 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 206 may be enabled to employ various forms of communication technology, topology, computer-readable media, or the like, for communicating information from one electronic device to another. For example, network 206 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 206 may include various communication technologies by which information may travel between computing devices.

Network 206 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 206 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

In various embodiments, at least a portion of network 206 may be arranged as an autonomous system of nodes, links, paths, terminals, gateways, routers, switches, firewalls, load balancers, forwarders, repeaters, optical-electrical converters, base stations, or the like, which may be connected by various communication links. These autonomous systems may be configured to self-organize based on current operating conditions and/or rule-based policies, such that the network topology of the network may be modified.

Figure 2B:
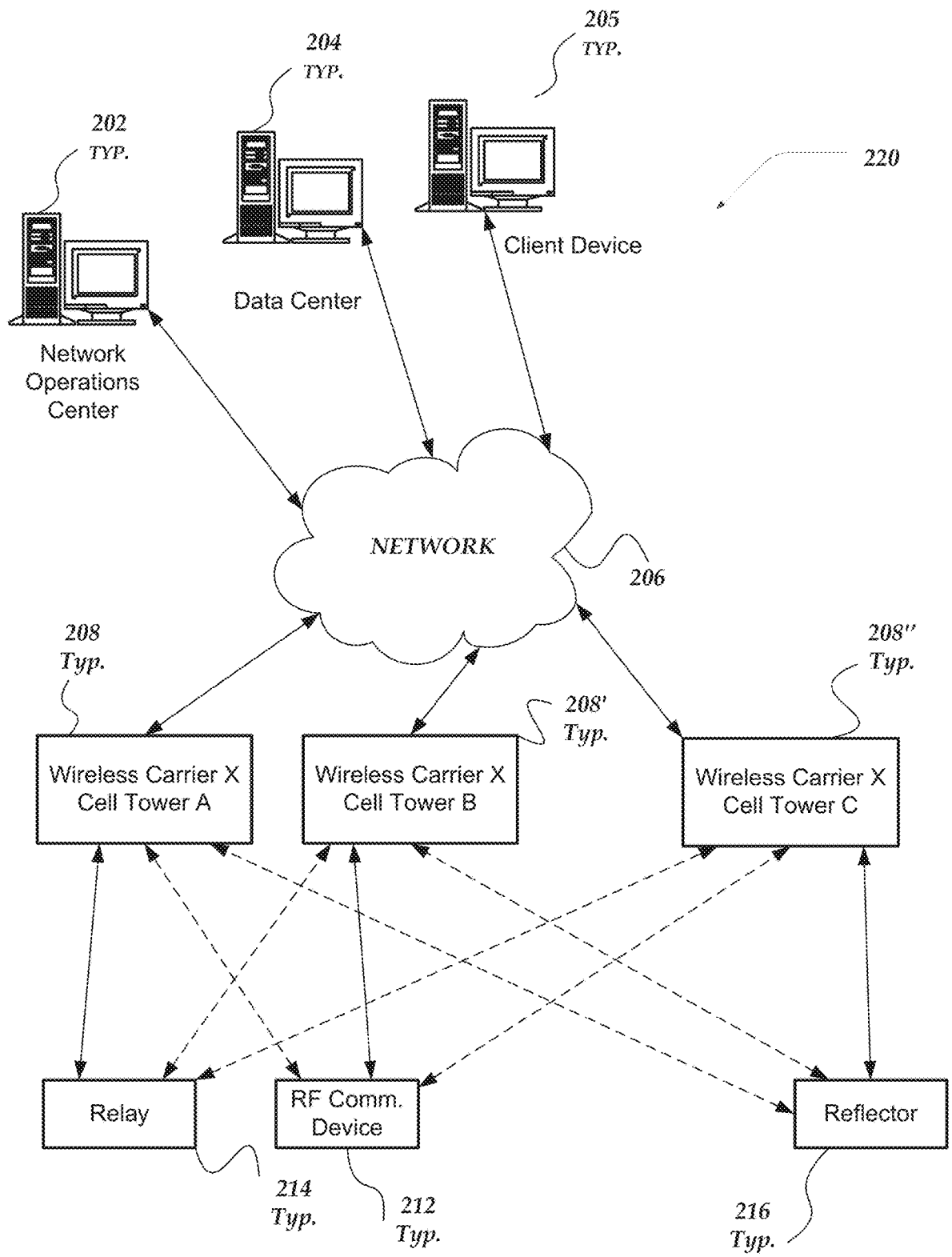
FIG. 2B shows an exemplary embodiment of RF reflector devices, RF relay devices, and RF communication devices in communication with primary and backup cellular tower locations that are associated the same wireless carrier.

FIG. 2B is somewhat similar to FIG. 2A, and illustrates an overview of system 220 for communicating data from one or more data centers 204 which employs one or more network operations centers 202 to route the data to one or more cellular communication towers 208', 208', and 208" that are associated with one wireless carrier (X) which communicate the data in the form of RF wireless signals to one or more RF communication devices 212, RF relay devices 214, and RF reflector devices 216, which provide communication with other remote UEs (not shown). As shown, the data is communicated from one or more data centers 204 and routed in part by one or more NOCs 202 over network 206 to a plurality of RF communication nodes located on a plurality of cellular communication towers 208, 208' and 208" associated with wireless carrier "X" that is authorized to communicate the data directly with one or more UEs, or one or more RF Communication devices 212 or RF repeater devices arranged as RF relay devices 214 or RF reflector devices 216. Also, one or more client devices 205 and service devices 211 may execute various network management applications that may distribute a map and manage, analyze and control the operation of the network and RF communication devices 212, RF relay devices 214 and/or RF reflector devices 216. As shown, an RF base station device may multiplex communication with RF communication devices 212, reflector devices 216, RF relay devices 214 and RF base station proxy devices (not shown).

As shown, each of RF communication device 212, RF relay device 214, and RF reflector device 216 is using a primary connection to communicate with different RF communication nodes at different cellular communication towers that are physically separate and associated with the same wireless carrier X. Also, each of RF communication device 212, RF relay device 214, and RF reflector device 216 is also monitoring the RF Signal power in a secondary connection with each of the other different RF communication nodes at other different cellular communication towers associated with the same wireless carrier X. The selection of the primary connection is based in part on the highest RF signal power provided by one of the RF communication nodes at each of the different cellular communication towers. Each of RF communication device 212, RF relay device 214, and RF reflector device 216 identifies which cellular communication tower provides more RF signal power/strength than the other two cellular communication towers for the particular device.

Alternatively, when the RF signal power of the primary connection drops below a threshold for one of RF communication device 212, RF relay device 214, or RF reflector device 216, the particular device's secondary connection to another RF communication node at another cellular communication tower with the highest RF Signal power above the threshold is selected as the primary connection for particular RF communication device or RF repeater device effected. The RF communication device 212, RF relay device 214, and RF reflector device 216, actively monitor the RF signal power for each available RF communication node, e.g., an RF base station device, at each cellular communication tower associated with a wireless carrier authorized to provide wireless communication with one or more UEs supported by particular RF communication devices or RF repeater devices.

FIG. 2C shows an RF repeater device configured as RF relay device 230 that includes controller 234 arranged to operate HMA 232A to communicate RF signals with HMA waveforms with remote RF communication node 236 and HMA 232B to communicate RF signals with HMA waveforms with another remote RF communication node 238. In one or more embodiments, RF relay device 230 may be configured to employ one or both of its HMAs to communicate with RF communication nodes that may be one or more of an RF base station device, an RF base station proxy device, an RF reflector device, another RF relay device, an RF communication device, or a UE.

FIG. 2D shows an RF repeater device configured as reflector device 240 that includes controller 244 arranged to operate HMA 242A to communicate RF signals with HMA waveforms with remote RF communication node 248 and HMA 242B to communicate RF signals with HMA waveforms with a plurality of other remote RF communication nodes 246. In one or more embodiments, RF reflector device 240 may be configured to employ one or more HMAs to multiplex communication with a plurality of RF communication nodes 246 that may be one or more of an RF base station device, an RF base station proxy device, an RF reflector device, another RF relay device, an RF communication device, or a UE.

Figure 2E:
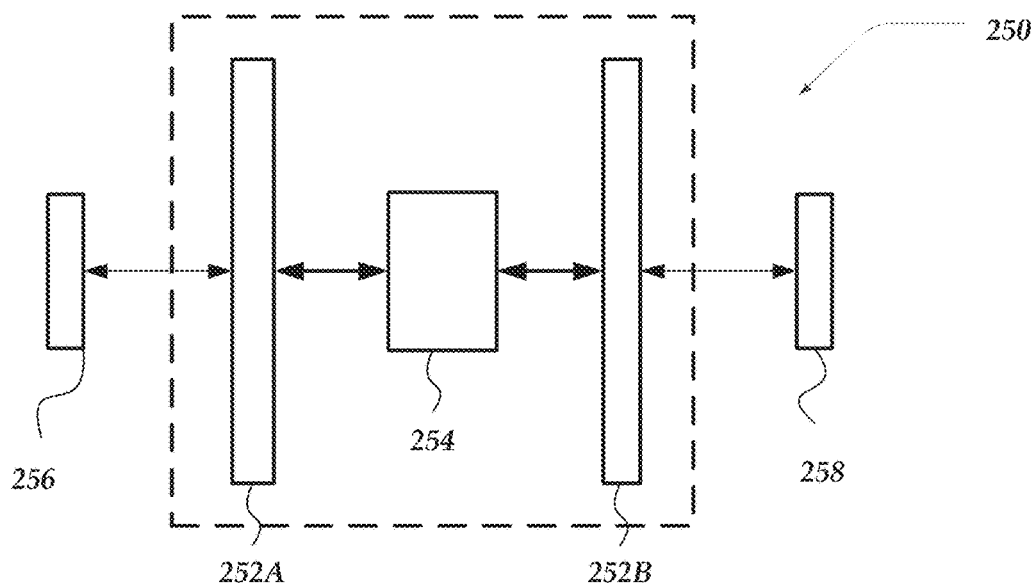
FIG. 2E illustrates an exemplary embodiment of an RF repeater device that is arranged as an RF base station proxy device that forwards communication of RF signals to a plurality of one or more of another RF base station proxy device, an RF relay device, an RF reflector device, an RF communication device, RF communication node, an RF base station device or a UE.

FIG. 2E shows an RF repeater device configured as RF base station proxy device 250 that includes controller 254 arranged to operate HMA 252A to communicate RF signals with HMA waveforms with remote RF communication node 256 and HMA 258B to communicate RF signals with HMA waveforms with another remote RF communication node 258. In one or more embodiments, RF base station proxy device 250 may be configured to employ one or both of its HMAs to communicate with RF communication nodes that may be one or more of an RF base station, an RF base station proxy device, an RF reflector device, another RF relay device, an RF communication device, or a UE.

Figure 2F:
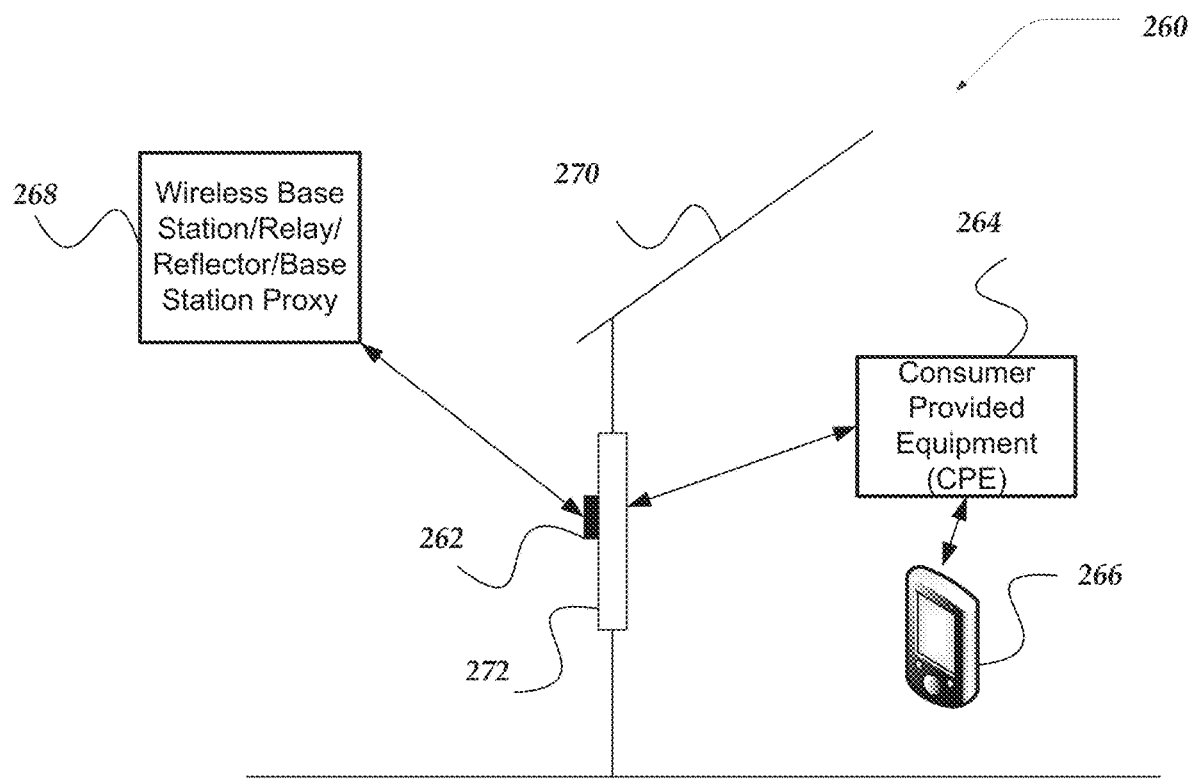
FIG. 2F illustrates a schematic view of an RF base station/reflector/base station proxy HMA device in communication with an RF Communication HMA devices disposed on an outside surface of a window of a structure and the wireless signals are communicated, by the RF Communication HMA device, to a customer provided equipment device (CPE) disposed inside the structure and which communicates the wireless signals to one or more wireless computing devices employed by one or more users.

FIG. 2F illustrates an overview of a remote RF Communication node 268 communicating upload and download RF wireless signals with RF communication device 262 having an external antenna (employing one or more HMAs) attached to an exterior surface of window 272 in structure 270. And internal antenna of device 262 communicates the upload and download RF wireless signals with one or more CPE devices 264 that further communicate with one or more wired and/or wireless UEs 266 disposed inside structure 270. Although not shown, RF communication device 262 may also include glass field couplers that are positioned on opposite sides of window 272 to wirelessly transmit and receive the RF wireless signals through the window. Also not shown, RF communication device 262 may include one or more amplifiers that may be provided to boost the upload and download RF wireless signals communicated through window 272 with remote RF communication node 268. Also, RF communication device 262 may be arranged to employ wirelessly delivered power, e.g., via inductive chargers, (not shown) that provide electrical power to the various components disposed on opposite sides of window 272. Additionally, RF communication node 268 may be an RF base station or an RF repeater device configured as one or more of a RF base station proxy device, an RF reflector device, or an RF relay device.

Exemplary Schematics

Figure 2G:
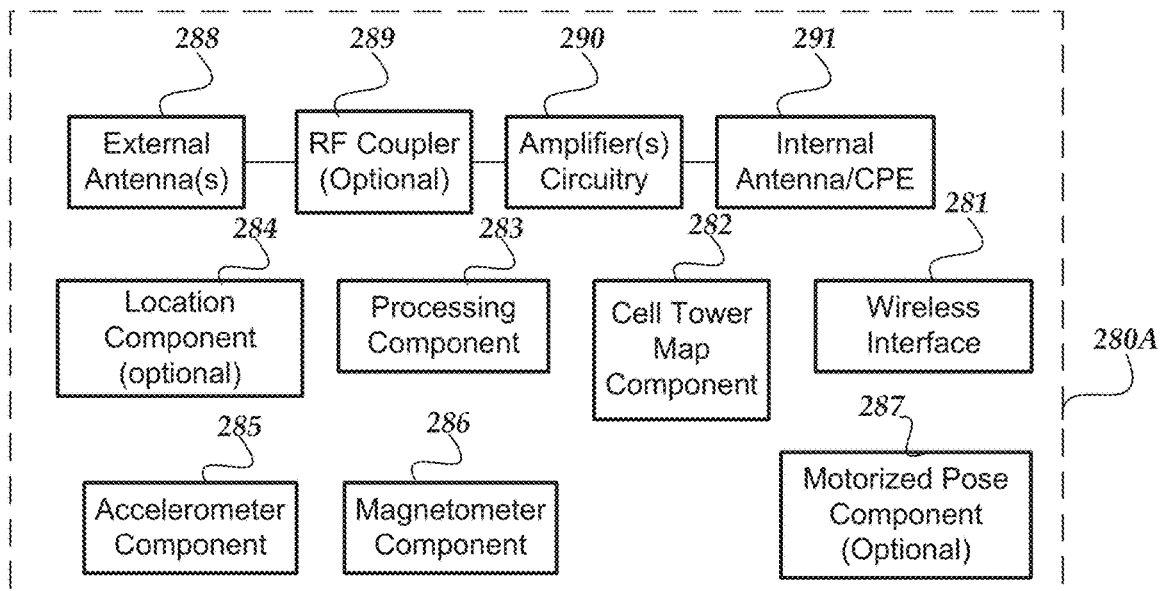
FIG. 2G shows an embodiment of an exemplary schematic for an RF communication device.

FIG. 2G shows an embodiment of an exemplary schematic for RF communication device 280A that is integrated with Consumer Provided Equipment (CPE) 291. In one or more embodiments, the RF communication device may be configured with all of its major components located on an outside surface of a barrier, all of the components located on an inside surface of the barrier, or a portion of the RF communication device's components that include external antenna 288 located on the barrier's outside surface, and the remaining portion located on the inside surface. Although not shown, in one or more embodiments, an internal antenna may be integrated with RF communication device 280A and the CPE 291 may be separately located inside a structure and communicate with RF Communication device 280A by a wired and/or wireless connection.

In one or more embodiments, external antenna 288 employs a scanning array antenna, such as an HMA, to communicate upload and download RF signals with a remotely located RF base station HMA device, RF relay HMA device, RF reflector HMA device, or RF proxy base station HMA device (not shown). When the RF communication device is located on the inside surface of a barrier, such as a glass window, external antenna 288 is positioned to communicate the upload and download RF signals through the glass barrier to one or more other remotely located wireless devices.

In one or more exemplary embodiments, external antenna 288 may adjust an HMA waveform employed by the HMA to compensate for a decrease in gain caused by the scan impedance of the glass window during communication through the glass window of the upload and download RF signals with the remote RF base station device. The scan impedance may be caused by one or more factors, including thickness of glass, index of refraction of the glass, layers of the glass, coatings on the glass, or the like. In one or more embodiments, the scan impedance compensation includes detecting a direction of the HMA waveform to provide the strongest RF power value for the RF signal communicated with the remotely located wireless HMA devices, and then employing HMA 288 to adjust the scan impedance of the wave front of the radiated RF signal. In one or more embodiments, the bias voltage to one or more varactors that control scattering elements of HMA 288 may be adjusted to increase the gain of the communicated RF signals.

Although not shown, in one or more embodiments, when CPE 291 is not integrated with RF Communication device 280A, an internal antenna may be included and configured as a sector antenna, or an omnidirectional antenna to communicate the upload and download RF signals with the separately located CPE. Additionally, in one or more embodiments, the internal antenna may be configured with an HMA to direct the communication of the upload and download RF signals at the remotely located CPE across relatively long distances such as found in stadiums, factories, assembly buildings, concert halls, or the like. Also, one or more of RF repeater devices configured as one or more of an RF relay HMA device, or an RF reflector HMA device may be employed to further extend a distance that the upload and download RF signals can be communicated inside a large structure to reach a remotely located CPE. Additionally, in one or more embodiments, the remotely located CPE may include a beam forming antenna, e.g., an HMA, to communicate upload and download RF communication signals with one or more of RF communication device 280A or an RF repeater device.

In one or more embodiments, location device 284 may optionally be included with RF communication device 280A. Location device 284 may include a Global Positioning System (GPS) device, and the like to detect a physical location of RF communication device 280A. Although not shown, triangulation of wireless signals from multiple RF base station devices or RF repeater devices located on RF communication structures, WiFi location information, network information, and the like, may be integrated over time to resolve a physical location of RF Communication device 280A.

Accelerometer component 285, magnetometer component 286, and/or a gyroscope may be included with RF Communication device 280A to provide movement, pose and orientation information relative to magnetic north/true north for the device. Also, map component 282 may be arranged to provide physical location and orientation information of one or more RF communication nodes, such as RF repeater devices or RF base station devices, located on RF communication structures in a network that is available to communicate with RF communication device 280A. Also, map component 282 may include the association of one or more wireless carriers with each mapped location of an RF base station device or an RF repeater device. The information provided by one or more of location device 284, accelerometer component 285, magnetometer component 286, map component 282, or a gyroscope is employed by processing component 283 to determine a current pose and orientation of RF Communication device 280A and external antenna 288 at a specific physical location. Also, the provided information enables processing component 283 to determine another pose and another orientation for RF communication device 280A that improves the power/strength value of RF signals communicated with a remotely located RF base station device, RF reflector device, RF proxy base station device, or the like. Additionally, the processing component 283 may use the current pose and orientation information to configure the HMA of external antenna 288 to update one or more of a shape and direction of a beam waveform. The updated beam waveform would be arranged to improve the strength/power value of RF signals communicated with a remotely located RF base station device, RF reflector device, RF proxy base station device, or the like.

In one or more embodiments, motorized pose component 287 may be optionally provided and employed to physically change the current pose/orientation to another pose/orientation for RF communication device 280A so that the power/strength value is improved for upload and download RF signals communicated with a remotely located RF base station device, reflector device, RF proxy base station device, or the like.

In one or more embodiments, pose/orientation information provided by processing component 283 may be employed by a technician to physically position an installation of RF communication device 280A in such a way as to provide a pose/orientation that improves the power/strength value of upload and download RF signals communicated with a remotely located RF base station device, RF reflector device, RF proxy base station device, or the like.

Wireless interface 281 may be employed to perform various functions with one or more different types of one or more different wireless communication protocols, such as Bluetooth, Bluetooth LE, Zigbee, WiFi, LTE, CDMA, GSM, TDMA, or the like. Further, in one or more embodiments, a webpage and/or an application may employ wireless interface 281 to provide different types of security, controls, and/or other information regarding RF communication device 280A. The information may include metrics, notifications, troubleshooting tips, software updates, strength/power of upload and download RF signals, alerts, restart controls, RF signal scanning controls, user permissions, metrics, map information, or the like. In one or more embodiments, wireless interface 281 may be employed to establish an in-band wireless communication channel between the remotely located CPE and RF communication device 280A. In another embodiment, wireless interface 281 may be employed to establish an out of band wireless communication channel between a technician and RF communication device 280A. Also, in yet another embodiment, wireless interface 281 may be employed to establish an out of band wireless communication with one or more remote network management applications, e.g., an analytics and control application, and/or map application, located at network operations centers, data centers, network computer devices, RF base station devices, or the like.

Although not shown, in one or more embodiments, an RF coupler may optionally be included to communicate the upload and download RF signals through a physical barrier, such as a glass window, when RF communication device 280A is physically located on an outside surface of the barrier or one portion of the RF communication device's components are located on the outside surface and another portion of the RF communication device's components are located on the inside surface of the barrier.

Although not shown, in one or more embodiments, one or more solar panels may be employed to provide electrical power to RF communication device 280A. Further, in one or more embodiments, when RF communication device 280A is entirely positioned on an inside surface of a barrier, electrical power may be provided directly by an electrical outlet located inside a structure.

In one or more embodiments, processing component 283 may be employed to control and/or manage operation of RF communication device 280A and one or all of the components included with the RF communication device. In one or more embodiments, processing component 283 includes one or more of a processor, memory, application specific integrated circuit (ASIC), Field Programmable Gate Array (FPGA), or the like.

Also, in one or more embodiments, amplifier component 289 may simultaneously provide continuous and separate gains to upload RF wireless signals and download RF wireless signals. The amplifier component may be configured to employ separate upload and download amplifiers to separately provide a gain to the upload RF wireless signal as it is radiated by the exterior antenna and another gain to the download RF wireless signal as it is radiated by the interior antenna to the CPE. Also, in yet other embodiments, the amplifier component may be arranged to provide separate gains to the upload and download RF wireless signals by isolating and timing the communication of these upload and download RF wireless signals.

Figure 2H:
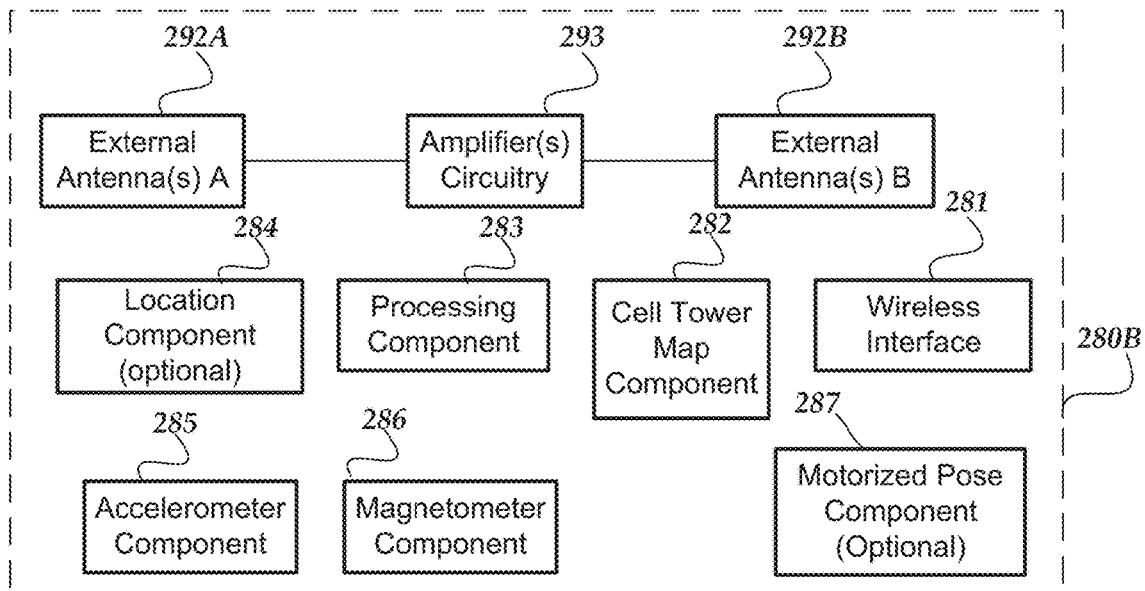
FIG. 2H illustrates an embodiment of an exemplary schematic for an RF repeater device that may be arranged to operate as an RF relay device, an RF reflector device, or an RF base station proxy device.

FIG. 2H illustrates an embodiment of a schematic for exemplary RF repeater device 280B that may be arranged to operate as an RF relay device, an RF reflector device, or an RF base station proxy device. RF repeater device 280B is configured substantially the same in some ways as RF Communication device 280A, which includes one or more of amplifier circuitry 293, optional location component 284, processing component 283, map component 282, wireless interface 281, accelerometer component 285, magnetometer component 286, optional motorized pose component 287, and amplifier circuitry 293. Also, RF repeater device 280B includes external antennas 292A and 282B that are arranged to receive RF signals received by one or more other RF repeater devices and forward these RF signals to another repeater device or an RF Communication device. Also, on one or more embodiments, antennas 282A and 292B may be provided as one or more HMA devices.

Illustrative Network Computer

Figure 3:
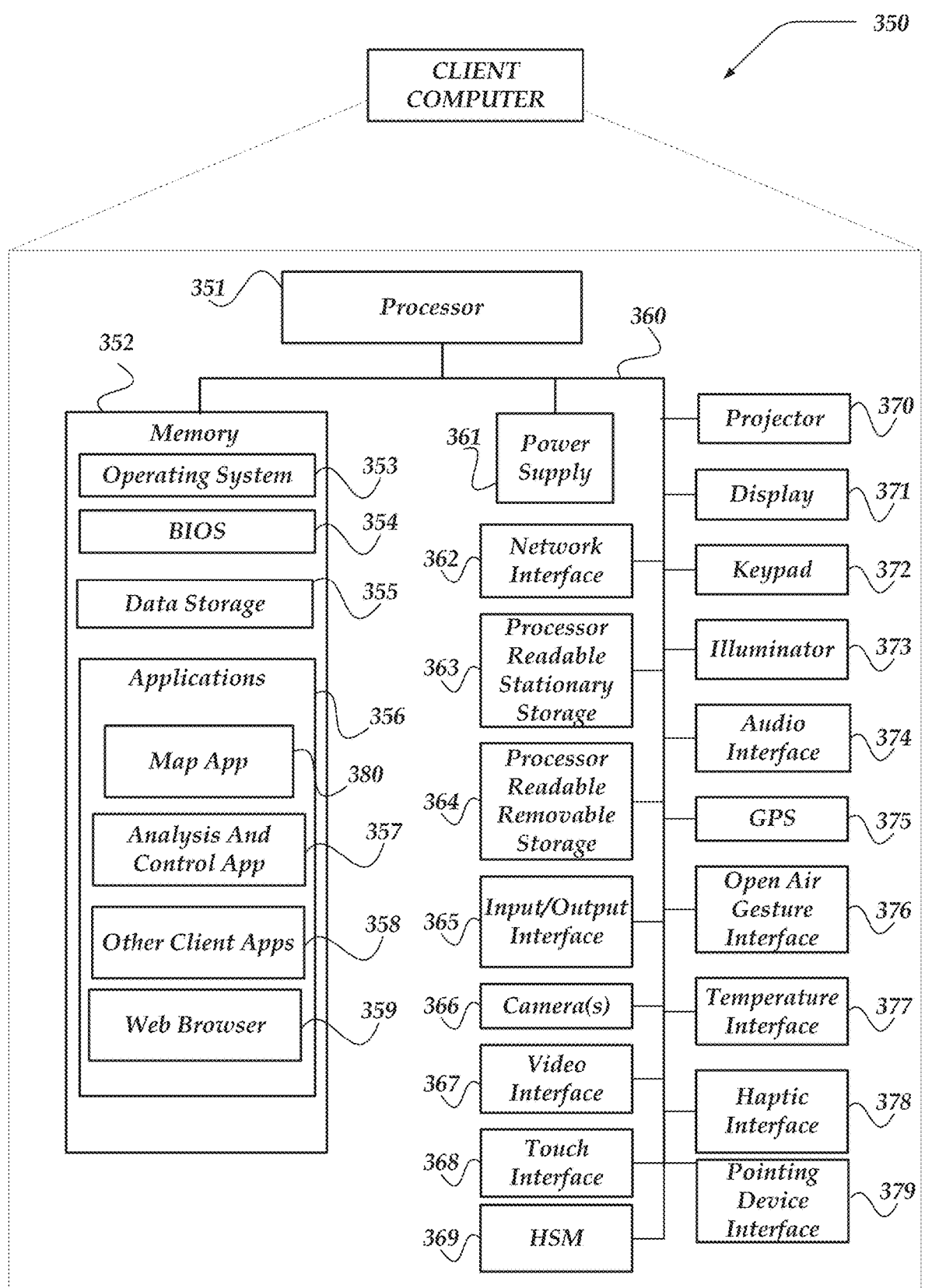
FIG. 3 shows an embodiment of an exemplary network computer device that may be included in a system such as shown in FIGS. 2A and 2B.

FIG. 3 shows one embodiment of network computer 350 that may include many more, or less, components than those shown. Network computer 350 may represent, for example, at least one embodiment of mobile computers, server computers, or client computers shown in FIGS. 2A and 2B.

Network computer 350 may include processor 351 in communication with memory 352 via bus 360. Network computer 350 may also include power supply 361, network interface 362, audio interface 374, display 371, keypad 372, illuminator 373, video interface 367, input/output interface 365, haptic interface 378, global positioning systems (GPS) receiver 375, open air gesture interface 376, temperature interface 377, camera(s) 367, projector 370, pointing device interface 379, processor-readable stationary storage device 363, and processor-readable removable storage device 364. Network computer 350 may optionally communicate with aa plurality of RF communication nodes on a network, e.g., RF base station devices, RF communication devices, and/or RF repeater devices or directly with another computer. Power supply 361 may provide power to network computer 350. A rechargeable or non-rechargeable battery may be used to provide power. The power may also be provided by an external power source, such as an AC adapter or a powered docking cradle that supplements or recharges the battery.

Network interface 362 includes circuitry for coupling network computer 350 to one or more networks, and it is constructed for use with one or more wired and/or wireless communication protocols and technologies. Examples of various generations (e.g., third (3G), fourth (4G), or fifth (5G)) of communication protocols and/or technologies may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MIMS), or various ones of a variety of other communication protocols and/or technologies.

Audio interface 374 may be arranged to produce and receive audio signals such as the sound of a human voice. For example, audio interface 374 may be coupled to a speaker and microphone (not shown) to enable telecommunication with others or generate an audio acknowledgement for some action. A microphone in audio interface 374 can also be used for input to or control of network computer 350, e.g., using voice recognition, detecting touch based on sound, and the like.

Display 371 may be a liquid crystal display (LCD), gas plasma, electronic ink, light emitting diode (LED), Organic LED (OLED) or any other type of light reflective or light transmissive display that can be used with a computer. Display 371 may also include a touch interface 368 arranged to receive input from an object such as a stylus or a digit from a human hand, and may use resistive, capacitive, surface acoustic wave (SAW), infrared, radar, or other technologies to sense touch or gestures. Further, projector 370 may be a remote handheld projector or an integrated projector that is operable to project an image on a remote wall or any other reflective object such as a remote screen.

Video interface 367 may be arranged to capture video images, such as a still photo, a video segment, an infrared video, or the like. For example, video interface 367 may be coupled to a digital video camera, a web-camera, or the like. Video interface 367 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 372 may comprise any input device arranged to receive input from a user. For example, keypad 372 may include a push button numeric dial, or a keyboard. Keypad 372 may also include command buttons that are associated with selecting and sending images.

Illuminator 373 may provide a status indication or provide light. Illuminator 373 may remain active for specific periods of time or in response to event messages. For example, when illuminator 373 is active, it may backlight the buttons on keypad 372 and stay on while the network computer is powered. Also, illuminator 373 may backlight these buttons in various patterns when particular actions are performed, such as dialing another network computer. Illuminator 373 may also enable light sources positioned within a transparent or translucent case of the network computer to illuminate in response to actions.

Further, network computer 350 may also comprise hardware security module (HSM) 369 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 369 may be a stand-alone computer, in other cases, HSM 369 may be arranged as a hardware card that may be added to a network computer.

Network computer 350 may also comprise input/output interface 365 for communicating with external peripheral devices or other computers such as other network computers. The peripheral devices may include an audio headset, virtual reality headsets, display screen glasses, remote speaker system, remote speaker and microphone system, and the like. Input/output interface 365 can utilize one or more technologies, such as Universal Serial Bus (USB), Infrared, WiFi, WiMax, Bluetooth™, and the like.

Input/output interface 365 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 350.

Haptic interface 378 may be arranged to provide tactile feedback to a user of the network computer. For example, the haptic interface 378 may be employed to vibrate network computer 350 in a particular way when another user of a computer is calling. Temperature interface 377 may be used to provide a temperature measurement input or a temperature changing output to a user of network computer 350. Open air gesture interface 376 may sense physical gestures of a user of network computer 350, for example, by using single or stereo video cameras, radar, a gyroscopic sensor inside a computer held or worn by the user, or the like. One or more cameras 366 may be used by an application to employ facial recognition methods to identify a user, track the user's physical eye movements, or take pictures (images) or videos.

GPS device 375 can determine the physical coordinates of network computer 350 on the surface of the Earth, which typically outputs a location as latitude and longitude values. GPS device 375 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 350 on the surface of the Earth. It is understood that GPS device 375 can employ a gyroscope to determine an orientation and/or an accelerometer to determine movement of the network computer 350. In one or more embodiment, however, network computer 350 may, through other components, provide other information that may be employed to determine a physical location of the network computer, including for example, a Media Access Control (MAC) address, IP address, and the like.

Human interface components can be peripheral devices that are physically separate from network computer 350, allowing for remote input or output to network computer 350. For example, information routed as described here through human interface components such as display 371 or keypad 372 can instead be routed through network interface 362 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a network computer with such peripheral human interface components is a wearable computer, which might include a remote pico projector along with one or more cameras that remotely communicate with a separately located network computer to sense a user's gestures toward portions of an image projected by the pico projector onto a reflected surface such as a wall or the user's hand.

Network computer 350 may include analysis and control application 357 and network management application 358 that may be configured to remotely manage operation of RF communication devices, RF base station devices, and RF repeater devices, i.e., relay devices, reflector devices, and RF base station proxy devices on a network, such as shown in FIGS. 2A and 2B. Applications 357 and 358 may provide information and metrics regarding communication of remote RF base station devices associated with different wireless carriers and physically located at different RF communication structure locations with a plurality of user devices (UEs). Also, applications 357 and 358 may authorize and enable different types of users (e.g., technicians, customers, and the like) to use a displayed interface to quickly identify and troubleshoot technical problems of RF communication devices and RF repeater devices in the network, assist in orientation of beam waveforms generated by beam antennas to provide improved strength/power of a wireless communication downlink between a remote RF base station device and a plurality of identified UEs. Applications 357 and 358 may also enable adjustment of particular performance parameters to improve one or more aspects of the operation of the one or more RF communication devices, RF base station devices, or RF repeater devices on the network. In one or more embodiments, applications 357 and 358 may employ Bluetooth, WiFi, LTE, or any other wireless or wired communication link to communicate in-band or out-of-band with the RF communication devices, RF base station devices, and/or RF repeater devices on the network.

Network computer 350 may include web browser application 359 that is configured to receive and to send web pages, web-based messages, graphics, text, multimedia, and the like. The network computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 352 may include RAM, ROM, or other types of memory. Memory 352 illustrates an example of computer-readable storage media (devices) for storage of information such as computer-readable instructions, data structures, program modules or other data. Memory 352 may store BIOS 354 for controlling low-level operation of network computer 350. The memory may also store operating system 353 for controlling the operation of network computer 350. It will be appreciated that this component may include a general-purpose operating system such as a version of UNIX, or LINUX™ or a specialized network computer communication operating system such as Windows Phone™, Apple iOS™ or the Symbian® operating system. The operating system may include, or interface with a Java virtual machine module that enables control of hardware components or operating system operations via Java application programs.

Memory 352 may further include one or more data storage 355, which can be utilized by network computer 350 to store, among other things, applications 356 or other data. For example, data storage 355 may also be employed to store information that describes various capabilities of network computer 350. The information may then be provided to another device or computer based on any of a variety of methods, including being sent as part of a header during a communication, sent upon request, or the like. Data storage 355 may also be employed to store social networking information including address books, buddy lists, aliases, user profile information, or the like. Data storage 355 may further include program code, data, algorithms, and the like, for use by a processor, such as processor 351 to execute and perform actions. In one embodiment, at least some of data storage 355 might also be stored on another component of network computer 350, including, but not limited to, non-transitory processor-readable removable storage device 364, processor-readable stationary storage device 363, or even external to the network computer.

Applications 356 may include computer executable instructions which, when executed by network computer 350, transmit, receive, or otherwise process instructions and data. Applications 356 may include, for example, analysis and control app 357, map application 380, and cloud based management application 358, web browser 359, or the like. Network computers may be arranged to exchange communications, such as, queries, searches, messages, notification messages, event messages, alerts, performance metrics, log data, API calls, or the like, combination thereof, with application servers or network monitoring computers. Map application 380 may be arranged to receive and provide various types of information including physical location and positions of RF base station devices and RF repeater devices located on RF communication structures, current availability to communicate with RF communication devices, and one or more associations of RF base station devices and RF repeater devices with one or more wireless carriers that are authorized to establish wireless connections with UEs in communication with RF communication devices on the network.

Applications 357, 358 and/or 380 may be employed to initially provide and discover types of information added to the map to establish localized and real-time network connection topology of the network, controlling gateway fault recovery, providing network load balancing at the 'last mile' from the RF base stations and RF repeater devices to the RF communication devices, providing network health metrics, and providing network utility assessment.

Additionally, network management application 358 may be employed to centrally control and manage the various types of information that are included in the map that is provided to the RF communication devices, and/or RF repeater devices and provide various reports to users.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), network computer 350 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), network computer 350 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Generalized Operations

Figure 4A:
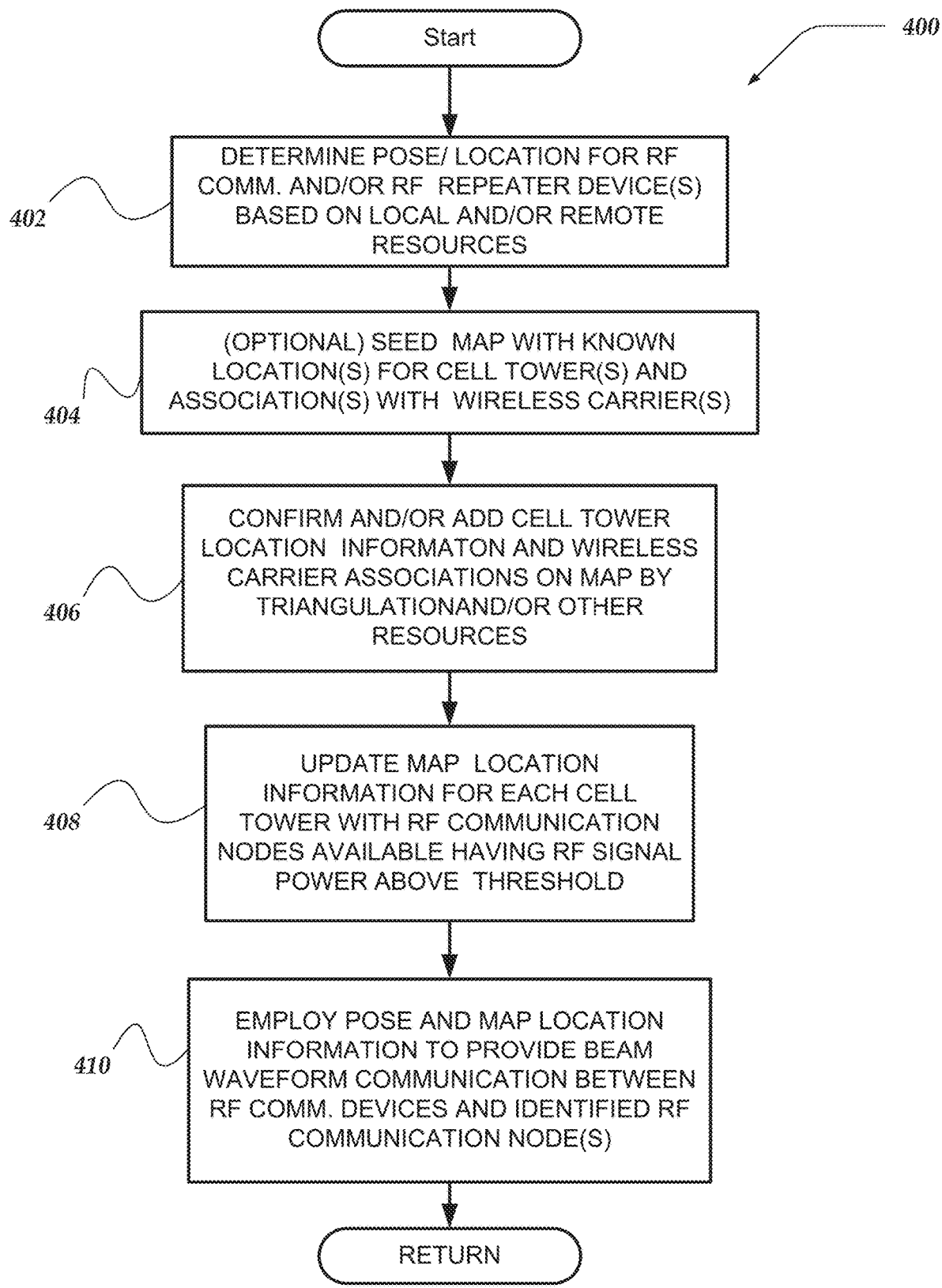
FIG. 4A illustrates an embodiment of a logical flow diagram for an exemplary method of improving communication of wireless RF signals between a plurality of user wireless devices (UEs) and authorized wireless carriers.

FIG. 4A illustrates a logical flow diagram of for an exemplary method of improving communication of wireless RF signals between a plurality of user wireless devices (UEs) and authorized wireless carriers. Moving from a start block, the process steps to block 402 where a pose/orientation and a physical location for an RF communication device or an RF repeater device (RF relay device, RF reflector device, or RF base station proxy device) is determined.

Optionally, at block 404, a map is seeded with known location information for RF communication structures, such as cellular communication towers, that include RF communication nodes, such as RF base station devices and/or RF repeater devices, are associated with wireless carriers that provide authorized communication over a wireless network for particular UEs connected to the network. In one or more embodiments, the known location of the cellular communication towers may be provided by the wireless carriers, third party services, remote network management applications, or physical surveys.

At block 406, the location information is determined for cellular communication towers and added to a map for a wireless network. In one or more embodiments, triangulation of RF signals radiated by one or more RF communication nodes on one or more cellular communication towers is employed to determine location information, such as a distance based on the RF signal power/strength value and physical coordinates of a known location of a cellular communication tower. Also, in one or more embodiments, when the RF signals are radiated by an RF communication node in a beam waveform, the orientation/direction of the beam waveform itself may be employed to determine a direction of a cellular communication tower that corresponds to the particular RF communication node. In one or more embodiments, UE location information, e.g., mobile telephone information, may be employed to improve the location information for one or more nearby cellular communication towers. Further, in one or more embodiments, Wifi location information, and the like, may be employed to improve the fidelity of the location information determined for the one or more cellular communication towers. Also, in one or more embodiments, previously determined location information is confirmed by dynamically redetermining the location information for each cellular communication tower included in the map.

At block 408, for RF communication nodes identified as included on a cellular communication tower located on the map and radiating RF signals with power/strength values greater than a threshold value, the location information is correspondingly updated on the map.

At block 410, pose/orientation information for an RF communication device and the map is employed to generate a beam waveform of RF signals directed at the physical coordinates of the cellular communication tower that includes an RF communication node that was previously identified to radiate RF signals with an RF power value greater than a threshold value. Alternatively, when the RF communication node radiates RF signals with an RF power value less than the threshold value, the pose/orientation information and the map is employed to generate another beam waveform of RF signals directed at the physical coordinates of another cellular communication tower that includes another RF communication node that was previously identified to radiate RF signals with an RF power value greater than the threshold value. Next, the process returns to performing other actions.

Figure 4B:
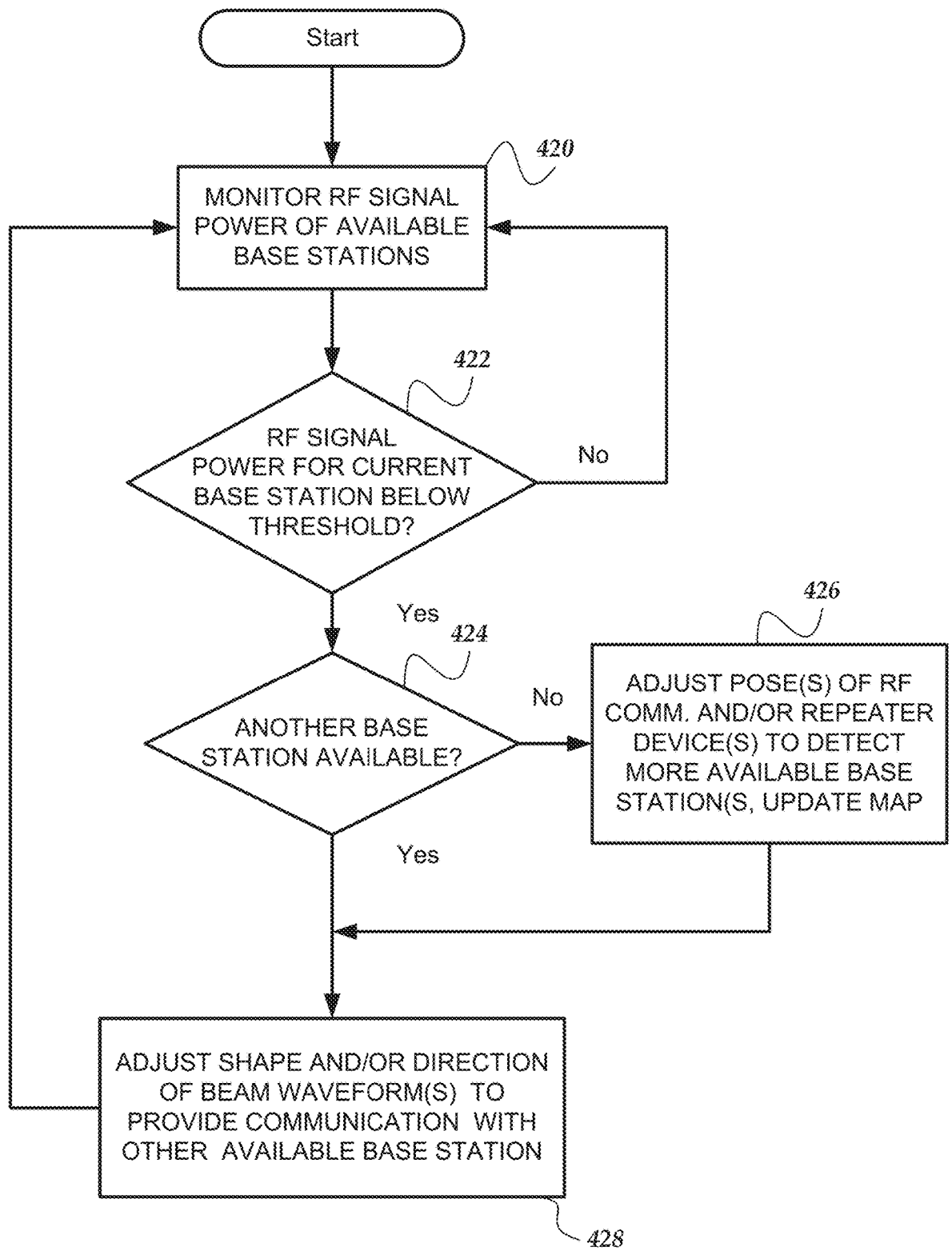
FIG. 4B shows an embodiment of a logical flow diagram for an exemplary method of identifying RF communication nodes that radiate RF signals with power greater than a threshold value.

FIG. 4B illustrates a logical flow diagram for an exemplary method of identifying RF communication nodes that radiate RF signals with power greater than a threshold value. At block 420, dynamic monitoring is provided for the power of RF signals radiated by each RF communication node, such as RF base station devices, included at locations of cellular communication towers associated with one or more wireless carriers. At decision block 422, a determination is made as to whether the RF signal power is above a threshold value. If false, the process loops back to block 420 and resumes the dynamic monitoring.

However, if the determination is true at decision block 422, then the process moves to decision block 424, where another determination is made as to whether another RF communication node associated with the same wireless carrier is available on the map that has been radiating RF signals with power greater than the threshold. If false, the process moves to block 426 where the pose of one or more of the RF communication device or RF repeater devices is adjusted to identify other RF communication nodes that radiate RF signals with power greater than the threshold value and disposed on other cellular communication towers associated with other locations.

Moving from block 426, the process moves to block 428 where the shape and direction of a beam waveform of RF signals radiated by the RF communication device is based on the location information associated with the other cellular communication tower that includes the identified other RF communication node. Alternatively, if the determination at decision block 424 was positive, then the process would move directly to block 428. Next, the process returns to performing other actions.

Figure 4C:
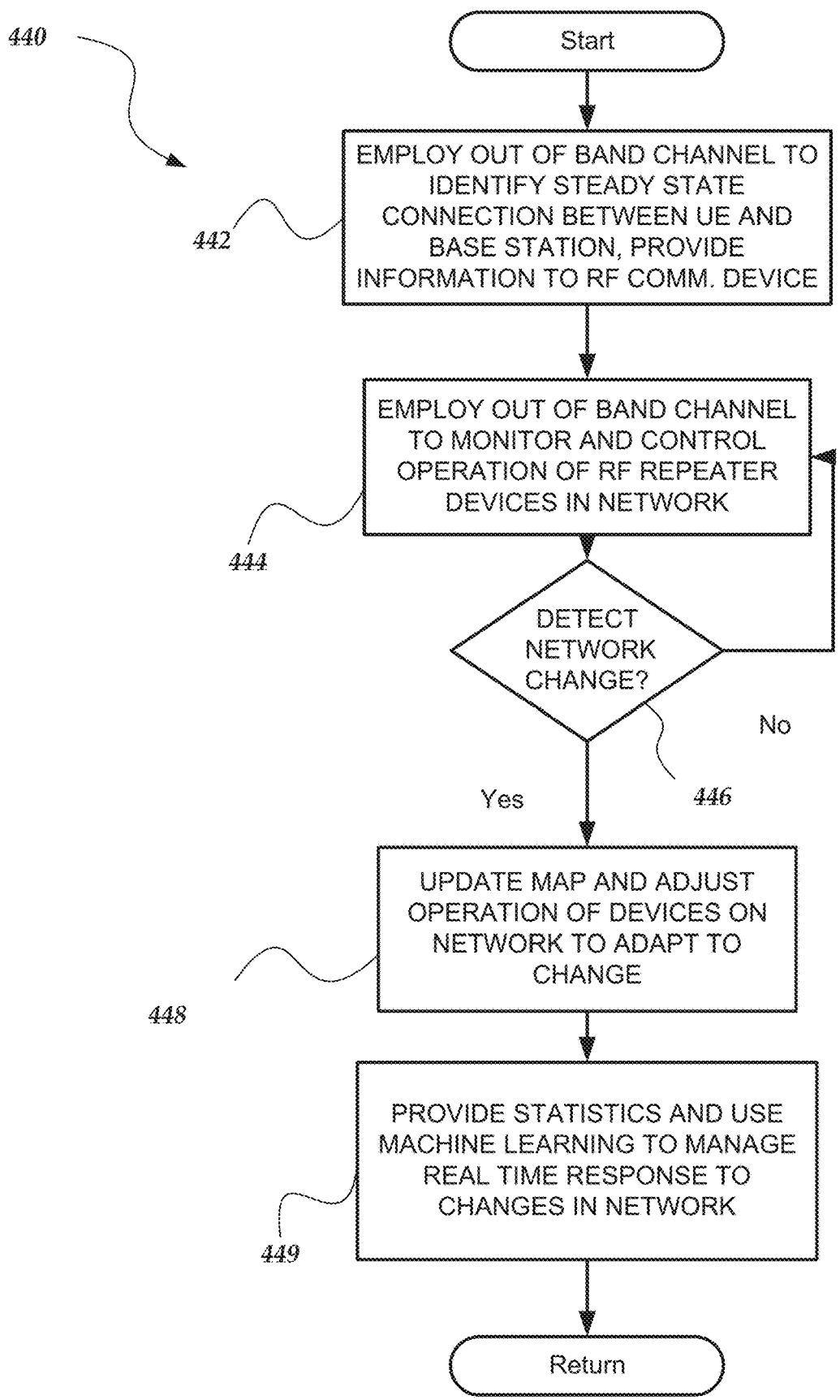
FIG. 4C shows an embodiment of a logical flow diagram for an exemplary method of employing an out of band communication channel to identify a connection on a wireless network between a UE and a remotely located RF communication node.

FIG. 4C illustrates a logical flow diagram of for an exemplary method 440 of employing an out of band communication channel to identify a connection on a wireless network between a UE and a remotely located RF communication node, such as an RF base station device. At block 442, a steady state connection between a UE and an RF base station device is identified with an out of band communication channel such as WiFi, Bluetooth, or LTE. The steady state information is provided to the RF communication device that is associated with the UE.

Moving to block 444, the out of band communication channel is employed to monitor and control the operation of the RF communication device and other RF repeater devices in the wireless network based in part on information collected from each device through the out of band channel.

At decision block 446, a determination is made as to whether or not a change has occurred in the wireless network. If false, the process loops back to block 444 and performs substantially the same actions again. Alternatively, when the determination is true, the process moves to block 448 wherein the operation is changed for one or more RF communication devices or RF repeater devices to adapt to the detected change in the wireless network. Also, the map is updated to reflect the change in operation of one or more devices.

Stepping to block 449, statistics for the operation of the wireless network are provided. Also, machine learning models may be used to manage real time responses to one or more changes in the wireless network. Next, the process returns to performing other actions.

Figure 4D:
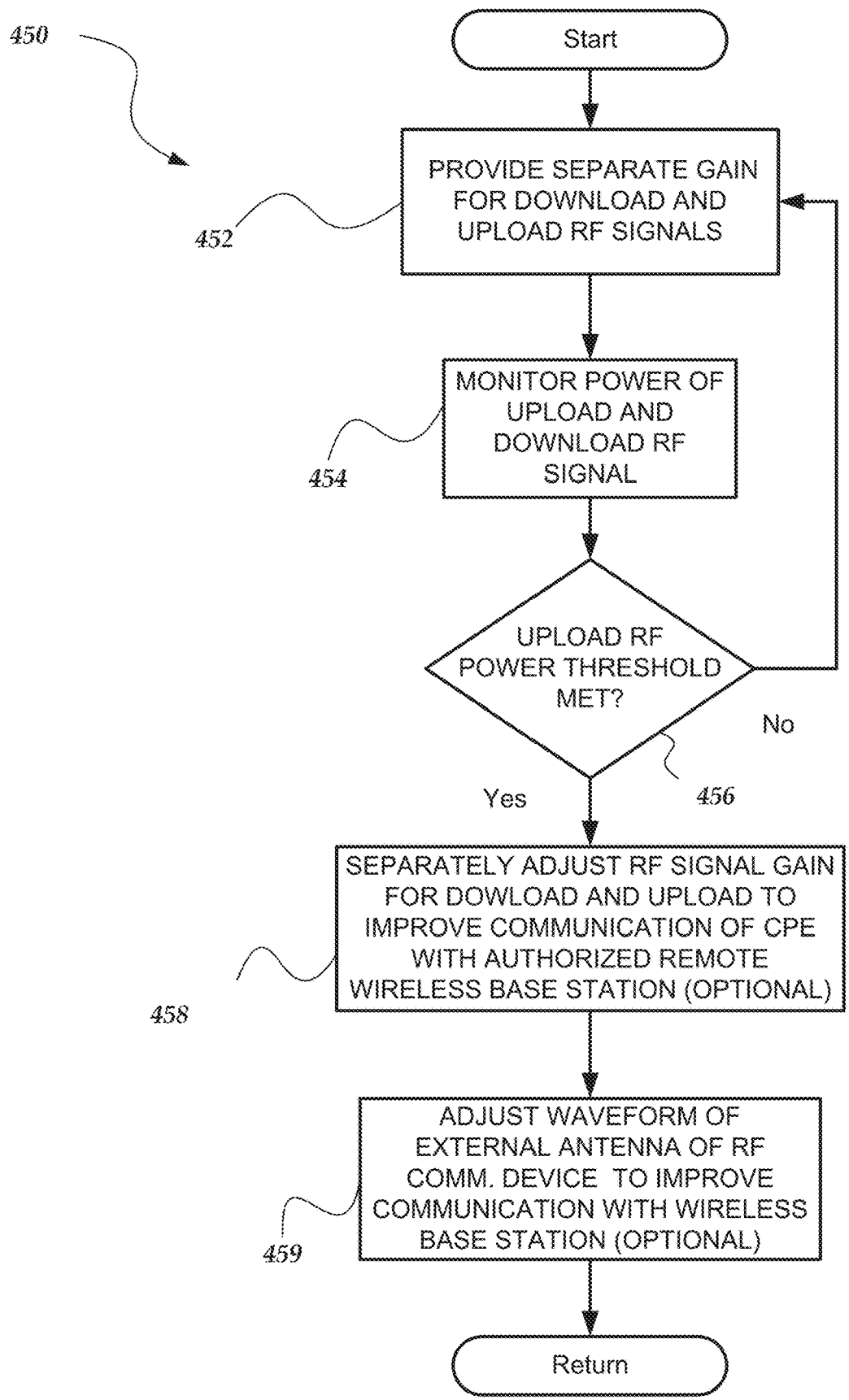
FIG. 4D illustrates an embodiment of a logical flow diagram for an exemplary method of employing a value of power of an upload RF wireless signal to determine communication with an authorized remote RF communication node, such as an RF base station device, and customer premises equipment.

FIG. 4D illustrates a logical flow diagram of for exemplary method 450 for employing a value of power of an upload RF wireless signal to determine communication with an authorized remote RF communication node, such as an RF base station, and customer premises equipment. Moving from a start block, the process advances to block 452 where a separately selectable (continuous) gain is provided to both an upload RF wireless signal and a download RF wireless signal. Next, the process steps to block 454 where a value of the power of the upload RF wireless signal and another value of the power of the download RF wireless signal is monitored.

Flowing to decision block 456, a determination is made whether a power value of the upload RF wireless signal meets a minimum threshold value for affirmative communication between an authorized remote RF base station and a CPE and the other power value of the download RF wireless signal indicates a presence of communication with a remote RF base station device. If false, the process loops back to block 452 to perform substantially the same actions. However, if the determination at block 456 is true the process steps to block 458 where the separately selectable gains for the upload and download RF wireless signals are adjusted to optimize communication between the CPE and the RF communication device and between the remote RF base station device and the RF communication device.

Next, the process advances to block 459 where optional adjustments to a shape and/or direction of the HMA waveform provided by the external antenna are made to optimize communication of the upload and download RF wireless signals between the RF communication device and the remote RF base station device. Further, the process returns to performing other actions.

Additionally, it will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. An RF communication device for communicating wireless radio frequency (RF) signals communicated over a network between one or more remote RF communication nodes and one or more user devices (UEs), comprising:
   one or more beam forming first antennas that communicate one or more beams of downlink and uplink wireless RF signals with the one or more remote RF communication nodes;
   one or more second antennas that communicate the downlink and uplink wireless signals to the one or more UEs that are local to the RF communication device; and
   one or more components that provide one or more of location information and position information for the RF communication device; and
   a controller that is operable to perform actions, including:
      receiving a map that includes types of information for communicating with the one or more remote RF communication nodes that are attached to one or more RF communication structures located on the map, wherein the types of information include one or more of a location, a position, and an association with one or more wireless carriers for the one or more remote RF communication nodes;
      employing the map to discover RF signals radiated by each remote RF communication node that is currently available for establishing a communication connection with a wireless carrier that is authorized to communicate with the one or more UEs;
      selecting an RF communication node to establish the communication connection between the authorized wireless carrier and the one or more UEs based on one or more characteristics of the one or more currently available remote RF communication nodes, wherein the one or more characteristics include one or more of a power value for radiated RF signals that is greater than a threshold value, or association with the wireless carrier that is authorized to communicate with the one or more UEs; and
      communicating with a remotely located network computer that performs actions, including:
         employing an out of band channel to identify steady state connections between the one or more UEs and the currently available RF communication nodes;
         employing the out of band channel to monitor and control one or more of remote RF communication nodes on the network; and
         in response to a change in operation of the network, adjusting the operation of one or more of the RF communication devices, or the one or more remote RF communication nodes.

2. The RF communication device of claim 1, wherein establishing the communication connection, further comprises:
   employing the location information and position information of the RF communication device and the one or more characteristics of the selected RF communication node to generate a beam waveform that is employed by the one or more first antennas to direct downlink and uplink wireless RF signals at an azimuth and an elevation corresponding to the selected RF communication node.

3. The RF communication device of claim 1, further comprising:
monitoring each RF communication node on the map for current availability to radiate RF signals at an RF power value that is greater than an RF power threshold value and having the association with the wireless carrier that is authorized to communicate with the one or more UEs; and
in response to the selected RF communication node radiating RF signals at another RF power value that is less than the RF power threshold value, selecting another currently available RF communication node that radiates RF signals at least greater than the RF power threshold value and having an association with the wireless carrier that is authorized to communicate with the one or more UEs.

4. The RF communication device of claim 1, wherein the one or more components further comprise a motor component that is operable to physically change the device from a current pose and orientation to a new pose and orientation, wherein in response to the new pose and orientation, the controller identifies one or more new RF communication nodes that are currently available to establish the communication connection with the wireless carrier authorized to communicate with the one or more UEs.

5. The RF communication device of claim 1, wherein the one or more components further comprise:
one or more of a compass component, an accelerometer component, an altimeter component, a magnetometer component, or a global positioning system (GPS) component; and
wherein the position information includes one or more of an altitude, a tilt, an orientation relative to a magnetic north direction, or a movement of the RF communication device, and wherein the location information includes one or more of a latitude coordinate and a longitude coordinate.

6. The RF communication device of claim 1, further comprising:
employing machine learning models to detect a change in operation of the network; and
employing the ML models to recommend adjustments to the operation of the one or more remote RF communication nodes or one or more RF communication devices on the network in response to the detected change.

7. The RF communication device of claim 1, further comprising:
providing updated information for the map to a remotely located network computer, wherein the updated information is employed to remotely modify the map, and wherein the modified map is distributed to each RF communication device located within at least a physical area defined by the updated map.

8. The RF communication device of claim 1, further comprising:
in response to an RF power value of the upload RF wireless signal being above an RF power threshold value, determining that a Customer Provided Equipment (CPE) is in communication with the wireless carrier that is authorized to communicate with the CPE, wherein a gain for the download RF wireless signal and the upload RF wireless signal are separately adjusted to increase an efficiency of communication between the CPE and the selected RF communication node.

9. A method for an RF communication device to communicate wireless radio frequency (RF) signals communicated over a network between one or more remote RF communication nodes and one or more user devices (UEs), wherein the RF communication device executes instructions to perform actions, comprising:
employing one or more beam forming first antennas to communicate one or more beams of downlink and uplink wireless RF signals with the one or more remote RF communication nodes;
employing one or more second antennas to communicate the downlink and uplink wireless signals to the one or more UEs that are local to the RF communication device; and
employing one or more components to provide one or more of location information and position information for the RF communication device; and
employing a controller to perform further actions, including:
receiving a map that includes types of information for communicating with the one or more remote RF communication nodes that are attached to one or more RF communication structures located on the map, wherein the types of information include one or more of a location, a position, and an association with a wireless carrier for the one or more remote RF communication nodes;
employing the map to discover RF signals radiated by each remote RF communication node that is currently available for establishing a communication connection with a wireless carrier that is authorized to communicate with the one or more UEs;
selecting an RF communication node to establish the communication connection between the authorized wireless carrier and the one or more UEs based on one or more characteristics of the one or more currently available remote RF communication nodes, wherein the one or more characteristics include one or more of a power value for radiated RF signals that is greater than a threshold value, or association with the wireless carrier that is authorized to communicate with the one or more UEs; and
communicating with a remotely located network computer that performs actions, including:
employing an out of band channel to identify steady state connections between the one or more UEs and the currently available RF communication nodes;
employing the out of band channel to monitor and control one or more of remote RF communication nodes on the network; and
in response to a change in operation of the network, adjusting the operation of one or more of the RF communication devices, or the one or more remote RF communication nodes.

10. The method of claim 9, wherein establishing the communication connection, further comprises:
employing the location information and position information of the RF communication device and the one or more characteristics of the selected RF communication node to generate a beam waveform that is employed by the one or more first antennas to direct downlink and uplink wireless RF signals at an azimuth and an elevation corresponding to the selected RF communication node.

11. The method of claim 9, further comprising:
monitoring each RF communication node on the map for current availability to radiate RF signals at an RF power value that is greater than an RF power threshold value and having the association with the wireless carrier that is authorized to communicate with the one or more UEs; and
in response to the selected RF communication node radiating RF signals at another RF power value that is less than the RF power threshold value, selecting another currently available RF communication node that radiates RF signals at least greater than the RF power threshold value and having an association with the wireless carrier that is authorized to communicate with the one or more UEs.

12. The method of claim 9, wherein the one or more components further comprise a motor component that is operable to physically move the device from a current pose and orientation to a new pose and orientation, wherein in response to the new pose and orientation, the controller identifies one or more new RF communication nodes that are currently available to establish the communication connection with the wireless carrier authorized to communicate with the one or more UEs.

13. The method of claim 9, wherein the one or more components further comprise:
one or more of a compass component, an accelerometer component, an altimeter component, a magnetometer component, or a global positioning system (GPS) component; and
wherein the position information includes one or more of an altitude, a tilt, an orientation relative to a magnetic north direction, or a movement of the RF communication device, and wherein the location information includes one or more of a latitude coordinate and a longitude coordinate.

14. The method of claim 9, further comprising:
employing machine learning models to detect a change in operation of the network; and
employing the ML models to recommend adjustments to the operation of the one or more remote RF communication nodes or one or more RF communication devices on the network in response to the detected change.

15. The method of claim 9, further comprising:
providing updated information for the map to a remotely located network computer, wherein the updated information is employed to remotely modify the map, and wherein the modified map is distributed to each RF communication device located within at least a physical area defined by the updated map.

16. The method of claim 9, further comprising:
in response to an RF power value of the upload RF wireless signal being above an RF power threshold value, determining that a Customer Provided Equipment (CPE) is in communication with the wireless carrier that is authorized to communicate with the CPE, wherein a gain for the download RF wireless signal and the upload RF wireless signal are separately adjusted to increase an efficiency of communication between the CPE and the selected RF communication node.

17. A system for communicating wireless radio frequency (RF) signals communicated over a network between one or more remote RF communication nodes and one or more user devices (UEs), comprising:
an RF communication device that executes actions, including:
employing one or more beam forming first antennas to communicate one or more beams of downlink and uplink wireless RF signals with the one or more remote RF communication nodes;
employing one or more second antennas to communicate the downlink and uplink wireless signals to the one or more UEs that are local to the RF communication device; and
employing one or more components to provide one or more of location information and position information for the RF communication device; and
employing a controller to perform further actions, including:
receiving a map that includes types of information for communicating with the one or more remote RF communication nodes that are attached to one or more RF communication structures located on the map, wherein the types of information include one or more of a location, a position, and an association with a wireless carrier for the one or more remote RF communication nodes;
employing the map to discover RF signals radiated by each remote RF communication node that is currently available for establishing a communication connection with a wireless carrier that is authorized to communicate with the one or more UEs; and
selecting an RF communication node to establish the communication connection between the authorized wireless carrier and the one or more UEs based on one or more characteristics of the one or more currently available remote RF communication nodes, wherein the one or more characteristics include one or more of a power value for radiated RF signals that is greater than a threshold value, or association with the wireless carrier that is authorized to communicate with the one or more UEs; and
a network computer, that performs further actions, including:
in response to receiving updated information for the map from the RF communication device, modifying and distributing it to each RF communication device located within at least a physical area defined by the updated map;
employing an out of band channel to identify steady state connections between the one or more UEs and the currently available RF communication nodes;
employing the out of band channel to monitor and control one or more of remote RF communication nodes on the network; and
in response to a change in operation of the network, adjusting the operation of one or more of the RF communication devices, or the one or more remote RF communication nodes.

18. The system of claim 17, wherein establishing the communication connection, further comprises:
employing the location information and position information of the RF communication device and the one or more characteristics of the selected RF communication node to generate a beam waveform that is employed by the one or more first antennas to direct downlink and uplink wireless RF signals at an azimuth and an elevation corresponding to the selected RF communication node.

19. The system of claim 17, further comprising:
monitoring each RF communication node on the map for current availability to radiate RF signals at an RF power value that is greater than an RF power threshold value and having the association with the wireless carrier that is authorized to communicate with the one or more UEs; and
in response to the selected RF communication node radiating RF signals at another RF power value that is less than the RF power threshold value, selecting another currently available RF communication node that radiates RF signals at least greater than the RF power threshold value and having an association with the wireless carrier that is authorized to communicate with the one or more UEs.

20. The system of claim 17, wherein the one or more components further comprise a motor component that is operable to physically move the device from a current pose and orientation to a new pose and orientation, wherein in response to the new pose and orientation, the controller identifies one or more new RF communication nodes that are currently available to establish the communication connection with the wireless carrier authorized to communicate with the one or more UEs.

21. The system of claim 17, wherein the one or more components further comprise:
one or more of a compass component, an accelerometer component, an altimeter component, a magnetometer component, or a global positioning system (GPS) component; and
wherein the position information includes one or more of an altitude, a tilt, an orientation relative to a magnetic north direction, or a movement of the RF communication device, and wherein the location information includes one or more of a latitude coordinate and a longitude coordinate.

22. The system of claim 17, further comprising:
employing machine learning models to detect a change in operation of the network; and
employing the ML models to recommend adjustments to the operation of the one or more remote RF communication nodes or one or more RF communication devices on the network in response to the detected change.

23. The system of claim 17, further comprising:
in response to an RF power value of the upload RF wireless signal being above an RF power threshold value, determining that a Customer Provided Equipment (CPE) is in communication with the wireless carrier that is authorized to communicate with the CPE, wherein a gain for the download RF wireless signal and the upload RF wireless signal are separately adjusted to increase an efficiency of communication between the CPE and the selected RF communication node.

24. A processor readable non-transitory computer media that includes instructions for employing an RF communication device to communicate wireless radio frequency (RF) signals communicated over a network between one or more remote RF communication nodes and one or more user devices (UEs), wherein execution of the instructions by the RF communication device perform actions, comprising:
employing one or more beam forming first antennas to communicate one or more beams of downlink and uplink wireless RF signals with the one or more remote RF communication nodes;
employing one or more second antennas to communicate the downlink and uplink wireless signals to the one or more UEs that are local to the RF communication device; and
employing one or more components to provide one or more of location information and position information for the RF communication device; and
employing a controller to perform further actions, including:
receiving a map that includes types of information for communicating with the one or more remote RF communication nodes that are attached to one or more RF communication structures located on the map, wherein the types of information include one or more of a location, a position, and an association with a wireless carrier for the one or more remote RF communication nodes;
employing the map to discover RF signals radiated by each remote RF communication node that is currently available for establishing a communication connection with a wireless carrier that is authorized to communicate with the one or more UEs; and
selecting an RF communication node to establish the communication connection between the authorized wireless carrier and the one or more UEs based on one or more characteristics of the one or more currently available remote RF communication nodes, wherein the one or more characteristics include one or more of a power value for radiated RF signals that is greater than a threshold value, or association with the wireless carrier that is authorized to communicate with the one or more UEs; and
communicating with a remotely located network computer that performs actions, including:
employing an out of band channel to identify steady state connections between the one or more UEs and the currently available RF communication nodes;
employing the out of band channel to monitor and control one or more of remote RF communication nodes on the network; and
in response to a change in operation of the network, adjusting the operation of one or more of the RF communication devices, or the one or more remote RF communication nodes.

* * * * *